(12) United States Patent
Whyte et al.

(10) Patent No.: US 12,327,920 B2
(45) Date of Patent: Jun. 10, 2025

(54) SUB-REFLECTOR ASSEMBLIES AND RELATED ANTENNA ASSEMBLIES

(71) Applicant: Outdoor Wireless Networks LLC, Claremont, NC (US)

(72) Inventors: Griogair Whyte, Larbert (GB); David John Walker, Glasgow (GB); Hongliang Guo, Edinburgh (GB); Benjamin Cousino, St Andrews (GB); Craig Mitchelson, Cumbernauld (GB); Matthew Lewry, Limekilns (GB)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 150 days.

(21) Appl. No.: 18/296,179

(22) Filed: Apr. 5, 2023

(65) Prior Publication Data
US 2023/0335895 A1   Oct. 19, 2023

Related U.S. Application Data

(60) Provisional application No. 63/330,904, filed on Apr. 14, 2022.

(51) Int. Cl.
*H01Q 3/02* (2006.01)
*H04B 7/0413* (2017.01)
*H04B 7/06* (2006.01)

(52) U.S. Cl.
CPC .......... *H01Q 3/02* (2013.01); *H04B 7/0413* (2013.01); *H04B 7/0617* (2013.01)

(58) Field of Classification Search
CPC ........ H01Q 3/02; H01Q 1/1228; H01Q 19/19; H01Q 3/20; H01Q 15/14; H01Q 1/12; H01Q 1/42; H04B 7/0413; H04B 7/0617
See application file for complete search history.

(56) References Cited

U.S. PATENT DOCUMENTS 3,383,692 A * 5/1968 Laibson ............... H01Q 1/1264
  343/915
3,386,100 A * 5/1968 Jaszberenyi ......... H01Q 1/1264
  343/781 R
(Continued)

FOREIGN PATENT DOCUMENTS

DE       3231097 A1    2/1984
JP    2002261541 A *   9/2002
(Continued)

OTHER PUBLICATIONS

Feresidis, Alexandros, "Tunable Piezo-actuated High Impedance Surfaces for Beam Steered Millimeter Wave Antennas", 2017 IEEE International Symposium on Antennas and Propagation & USNC/URSI National Radio Science Meeting, San Diego, CA, USA, Jul. 9, 2017, pp. 1021-1022.
(Continued)

*Primary Examiner* — Dameon E Levi
*Assistant Examiner* — Jordan E. DeWitt
(74) *Attorney, Agent, or Firm* — Myers Bigel, P.A.

(57) ABSTRACT

The present disclosure is directed to a sub-reflector assembly for a point-to-point antenna. The sub-reflector assembly includes a main body configured to hold an antenna, a sub-reflector supported by a plurality of support members extending axially outwardly from the main body, and an adjustment mechanism coupled to the sub-reflector and at least two of the support members, the adjustment mechanism configured to adjust the position of the sub-reflector relative to the main body to steer an antenna beam from the antenna. Related antenna assemblies are also described herein.

19 Claims, 24 Drawing Sheets

(56) References Cited

U.S. PATENT DOCUMENTS

| | | | | |
|---|---|---|---|---|
| 3,745,582 | A * | 7/1973 | Karikomi | H01Q 3/16 |
| | | | | 343/837 |
| 5,086,303 | A * | 2/1992 | Usui | H01Q 19/193 |
| | | | | 343/756 |
| 9,118,106 | B2 * | 8/2015 | Adams | H01Q 1/12 |
| 9,781,233 | B2 * | 10/2017 | Wattwood | H01Q 1/1257 |
| 2013/0249754 | A1 * | 9/2013 | Rice, I | H01P 1/173 |
| | | | | 343/756 |
| 2016/0104941 | A1 * | 4/2016 | Lee | H01Q 1/523 |
| | | | | 343/702 |
| 2019/0190146 | A1 * | 6/2019 | Hand | H01Q 3/2658 |
| 2022/0052459 | A1 * | 2/2022 | Ado | H01Q 19/18 |
| 2022/0094051 | A1 * | 3/2022 | Ameer P | H01Q 21/26 |
| 2023/0155297 | A1 * | 5/2023 | Saraf | H01Q 3/18 |
| | | | | 343/761 |
| 2023/0335895 | A1 * | 10/2023 | Whyte | H01Q 19/19 |
| 2024/0030617 | A1 * | 1/2024 | Bieber | H01Q 1/005 |

FOREIGN PATENT DOCUMENTS

| | | |
|---|---|---|
| KR | 20080056543 A | 6/2008 |
| WO | 2022063479 A1 | 3/2022 |

OTHER PUBLICATIONS

Hum, Sean Victor, et al., "Reconfigurable Reflectarrays and Array Lenses for Dynamic Antenna Beam Control: A Review", IEEE Transactions on Antennas and Propagation, vol. 62, No. 1, Jan. 2014, pp. 183-198.

Johannsen, U., et al., "ARoF-Fed Antenna Architectures for 5G Networks", IEEE 2019 Optical Fiber Communications Conference and Exhibition (OFC), San Diego, CA, USA, Mar. 3, 2019, 3 pp.

Leong, Kevin M.K.H., et al., "A Full Duplex Capable Retrodirective Array System for High-Speed Beam Tracking and Pointing Applications", IEEE Transactions on Microwave Theory and Techniques, vol. 52, No. 5, May 2004, pp. 1479-1489.

Lu, Hongda, et al., "Compact Air-Filled Luneburg Lens Antennas Based on Almost-Parallel Plate Waveguide Loaded With Equal-Sized Metallic Posts", IEEE Transactions on Antennas and Propagation, vol. 67, No. 11, Nov. 2019, pp. 6829-6838.

Malyuskin, Oleksandr, et al., "Ultracompact Retrodirective Antenna Arrays With Superdirective Radiation Patterns", IEEE Transactions on Antennas and Propagation, vol. 64, No. 7, Jul. 2016, pp. 2923-2935.

Miyamoto, Ryan Y., et al., "Retrodirective Arrays for Wireless Communications", IEEE Microwave Magazine, Mar. 2002, pp. 71-79.

Moessinger, A., et al., "Electronically reconfigurable reflectarrays with nematic liquid crystals", Electronics Letters, vol. 42, No. 16, Aug. 3, 2006, 2 pp.

Rohrdantz, Benjamin, et al., "An Electronically Scannable Reflector Antenna Using a Planar Active Array Feed at Ka-Band", IEEE Transactions on Microwave Theory and Techniques, vol. 65, No. 5, May 2017, pp. 1650-1661.

Rotshild, David, et al., "Wideband reconfigurable entire Ku-band metasurface beam-steerable reflector for satellite communications", IET Microwaves, Antennas & Propagation, vol. 13 Iss. 3, Jan. 28, 2019, pp. 334-339.

Singh, Hemant Rajveer, et al., "Automated Alignment of Microwave Antenna of Base Transceiver Station by Utilizing Hybrid Sources", TRJ (The Research Journal), vol. 2, Issue 2, Mar.-Apr. 2016, 5 pp.

Xu, Shenheng, et al., "Subreflectarrays for Reflector Surface Distortion Compensation", IEEE Transactions on Antennas and Propagation, vol. 57, No. 2, Feb. 2009, pp. 364-372.

Yu, Yikun, et al., "A 60 GHz Phase Shifter Integrated With LNA and PA in 65 nm CMOS for Phased Array Systems", IEEE Journal of Solid-State Circuits, vol. 45, No. 9, Sep. 2010, pp. 1697-1709.

"Communication with European Search Report", EP Application No. 23164996.3, Aug. 28, 2023, 9 pp.

* cited by examiner

SUB-REFLECTOR ASSEMBLIES AND RELATED ANTENNA ASSEMBLIES

RELATED APPLICATION(S)

The present application claims priority from and the benefit of U.S. Provisional Patent Application Ser. No. 63/330,904, filed Apr. 14, 2022, the disclosure of which is hereby incorporated herein in its entirety.

FIELD

The invention relates generally to telecommunications equipment, and more particularly, to sub-reflector assemblies for point-to-point antennas, and related antenna assemblies.

BACKGROUND

Many point-to-point backhaul communication links utilize traditional dish antennas consisting of a parabolic reflector and a single antenna element that illuminates the reflector. Advantageously, these dish antennas are relatively simple in design and can achieve relatively large antenna gain. Nonetheless, these antennas can exhibit some disadvantages. For example, the transmit power may be limited by the available output power of an amplifier, which can mean that costly semiconductor technologies may have to be used and/or parabolic reflector size may have to be increased to obtain sufficiently large effective isotropic radiated power (EIRP) levels. However, large reflector sizes typically yield narrower beamwidths, which can lead to static alignment difficulties during installation and dynamic alignment difficulties during adverse weather conditions, and lower net data rates. This is because the beam width is so fine that it become nearly impossible to reliably point/align and continuously hold the antenna beam on a required target in order to maintain adequate system gain.

One attempt to improve the gain/beamwidth tradeoff is disclosed in an article by H. Singh et al., entitled "Automated Alignment of Microwave Antenna of Base Transceiver Station by Utilizing Hybrid Sources," The Research Journal, Vol. 2, Issue 2, March-April 2016 (ISSN: 2454-7301); also published in Proceedings of the 10th International Conference on Circuits, Systems, Signal and Telecommunications (CSST), Feb. 13-15 (2016), pp. 141-146 (ISBN: 978-1-61804-366-5). As shown by FIG. 1, which is a reproduction of FIG. 1 from the H. Singh et al. article, a conventional terrestrial backhaul communication link is shown to include a repeating sequence of paired microwave antennas, which are aligned to face each other over fixed distances and along respective lines of sight (LOS). In addition, renewable and hybrid energy sources in the form of lithium ion batteries and wind turbines are utilized to power control logic and stepper motors that automatically perform vertical and horizontal realignment of the paired antennas to maintain sufficiently high received signal levels (RSL) between each pair of antennas. Thus, as shown by the schematic beam pattern diagrams of FIGS. 2A-2B, main lobe alignment can be controlled through manual adjustment of the antennas in the elevation plane (side view) and azimuth plane (top view). Another attempt to improve the gain and bandwidth of a point-to-point communication link is disclosed in U.S. Pat. No. 9,781,233 to Wattwood et al., entitled "Alignment System Including Remote Server for Point-to-Point Alignment of Spaced Apart First and Second Antennas and Related Methods." However, this system merely provides a mostly manual alignment technique using in-field maintenance personnel, and does not enable any automated real-time beam steering control to support optimum signal gain in the bidirectional communication links.

SUMMARY

A first aspect of the present invention is directed to a sub-reflector assembly for a point-to-point antenna. The sub-reflector assembly includes a main body configured to hold an antenna, a sub-reflector supported by a plurality of support members extending axially outwardly from the main body, and an adjustment mechanism coupled to the sub-reflector and at least two of the support members, the adjustment mechanism is configured to adjust the position of the sub-reflector relative to the main body to steer an antenna beam from the antenna.

Another aspect of the present invention is directed to an antenna assembly. The antenna assembly includes a point-to-point antenna, a main reflector, and a sub-reflector assembly coupled to the main reflector. The sub-reflector assembly includes a main body configured to hold the point-to-point antenna, a sub-reflector supported by a plurality of support members extending axially outwardly from the main body, and an adjustment mechanism coupled to the sub-reflector and at least two of the support members. The sub-reflector assembly resides behind the main reflector and the sub-reflector is positioned in front of the main reflector, and the adjustment mechanism is configured to adjust the position of the sub-reflector relative to the main body to steer an antenna beam from the point-to-point antenna.

Another aspect of the present invention is directed to a sub-reflector assembly for a point-to-point antenna. The sub-reflector assembly includes a main body configured to hold an antenna, a sub-reflector having a center ball socket, a first support member, a second support member, and a third support member, each support member extending axially outwardly from the main body, a cap plate secured to the sub-reflector, the cap plate having a center aperture and at least two slots that are open to and extend radially inwardly from an outer edge of the cap plate, a fourth support member extending axially outwardly from the center of the sub-reflector and through the center aperture in the cap plate, the fourth support member having a ball joint configured to be received by the ball socket of the sub-reflector to form a first ball-and-socket joint, a support plate secured to the free end of each of the four support members, an adjustment mechanism coupled to the first and second support members and the cap plate; and two driving struts, each driving strut secured within the first and second support members and coupled to adjustment mechanism, each driving strut coupled to a drive assembly.

Another aspect of the present invention is directed to a sub-reflector assembly for a point-to-point antenna. The sub-reflector assembly includes a main body configured to hold an antenna; a sub-reflector supported by a plurality of support members extending axially outwardly from the main body, one of the support members extending axially outwardly form the center of the sub-reflector, the support member being coupled to the sub-reflector via a universal joint; and an adjustment mechanism coupled to the sub-reflector. The adjustment mechanism includes one or more drive motors, each drive motor having a gear shaft extending outwardly therefrom; a pair of arm members, each arm member coupled to one or more gear shafts and configured to rotate in response to rotation of the one or more gear shafts; and a pair of levers, each lever coupled to a respective arm member via a mechanical linkage, the opposing end of each lever comprising a ball joint configured to be received within corresponding socket on the sub-reflector. The adjustment mechanism is configured to adjust a position of the sub-reflector relative to the main body to steer an antenna beam from the antenna.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
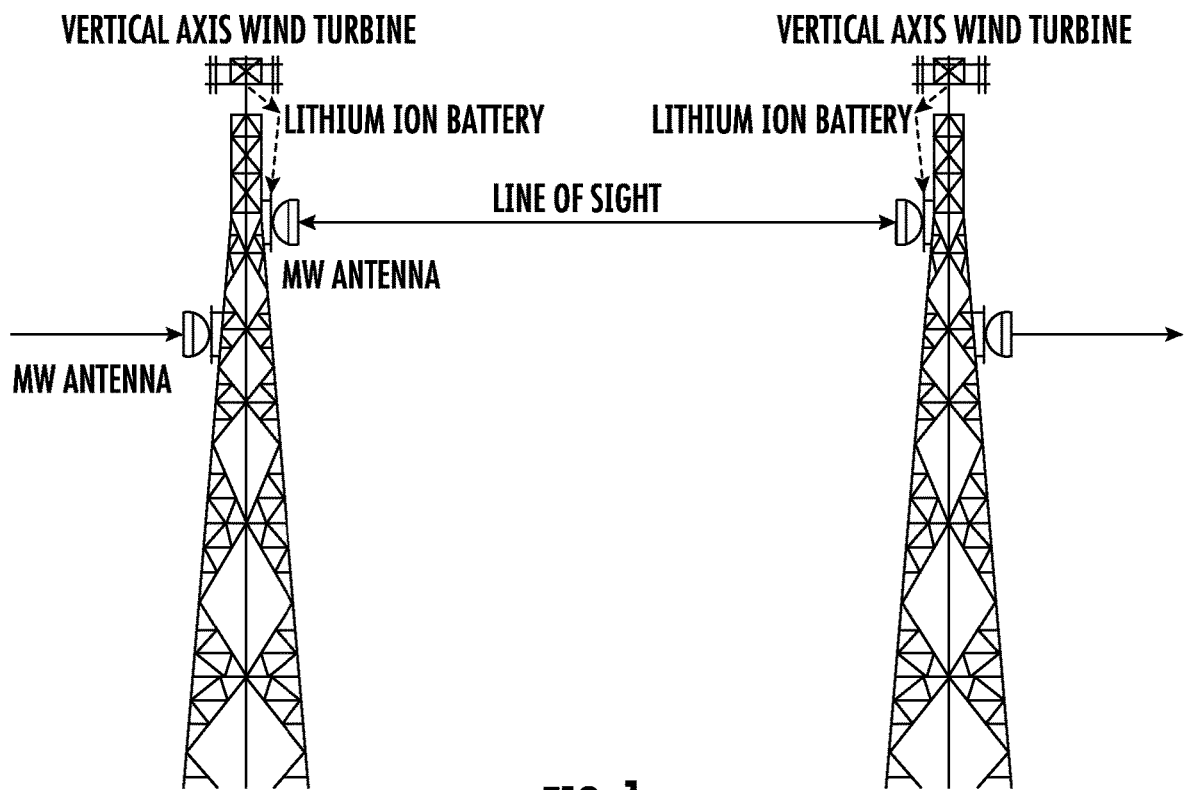
FIG. 1 is a schematic side view of a conventional terrestrial backhaul communication link including a repeating sequence of paired microwave antennas, which are aligned to face each other over fixed distances and along respective lines of sight (LOS).
Figure 2A:
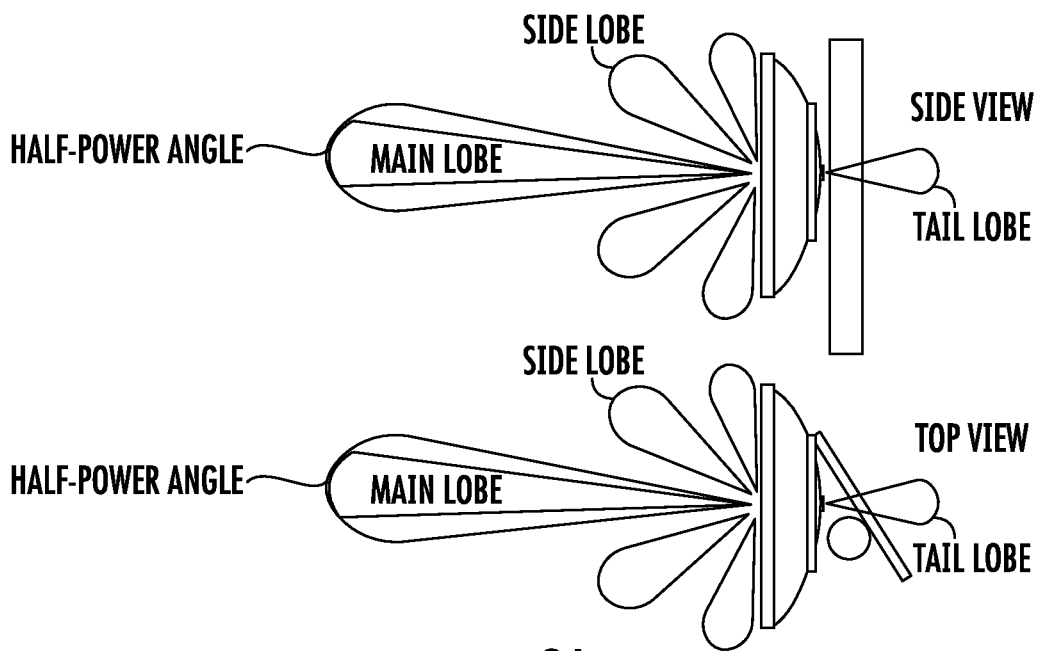
FIGS. 2A-2B are schematic diagrams of conventional main and side lobe beam patterns associated with the paired antennas within the terrestrial backhaul communication link of FIG. 1.
Figure 2B:
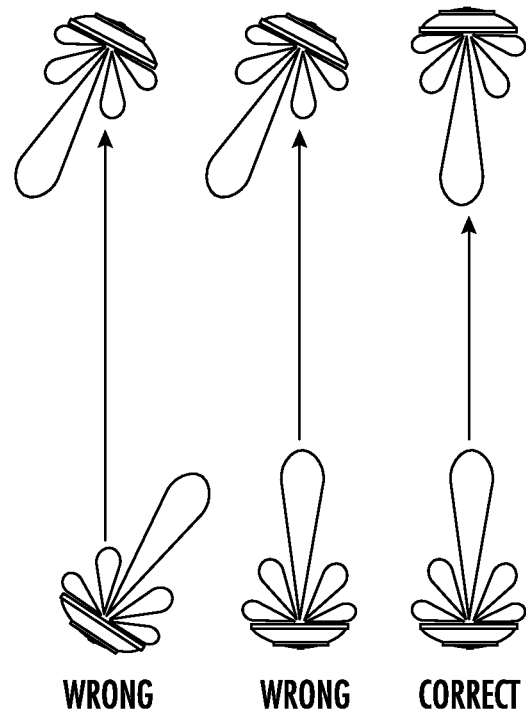

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

According to embodiments of the present invention, antenna assemblies and sub-reflector assemblies are provided in which a sub-reflector of a point-to-point antenna located in front of the main reflector is configured to be electromechanically moved via a gearing system situated behind the main reflector to achieve antenna beam steering. Other adjustment mechanisms for alternative sub-reflector assemblies are also described herein. Mechanical rotation of the sub-reflector can provide a number of advantages over other known antenna assemblies including, but not limited to, low loss and good beam pattern control compared to other assemblies, frequency adaptability, sufficient steering speed, and better cost efficiency. The sub-reflector assemblies according to embodiments of the present invention can further provide the benefits of a compact design, interchangeability of components within the field, and compatibility to fit within existing products.

Referring now to the figures, an antenna assembly according to embodiments of the present invention, designated broadly at 100, is illustrated in FIGS. 3A-3D. As shown in FIGS. 3A-3D, in some embodiments, the antenna assembly 100 of the present invention includes a main reflector 110 and a sub-reflector 250 which is part of a sub-reflector assembly 200. The antenna assembly 100 may be used with a point-to-point antenna. For example, in some embodiments, the antenna assembly 100 may be used with a millimeter wave (mmWave) antenna.

Figure 3A:
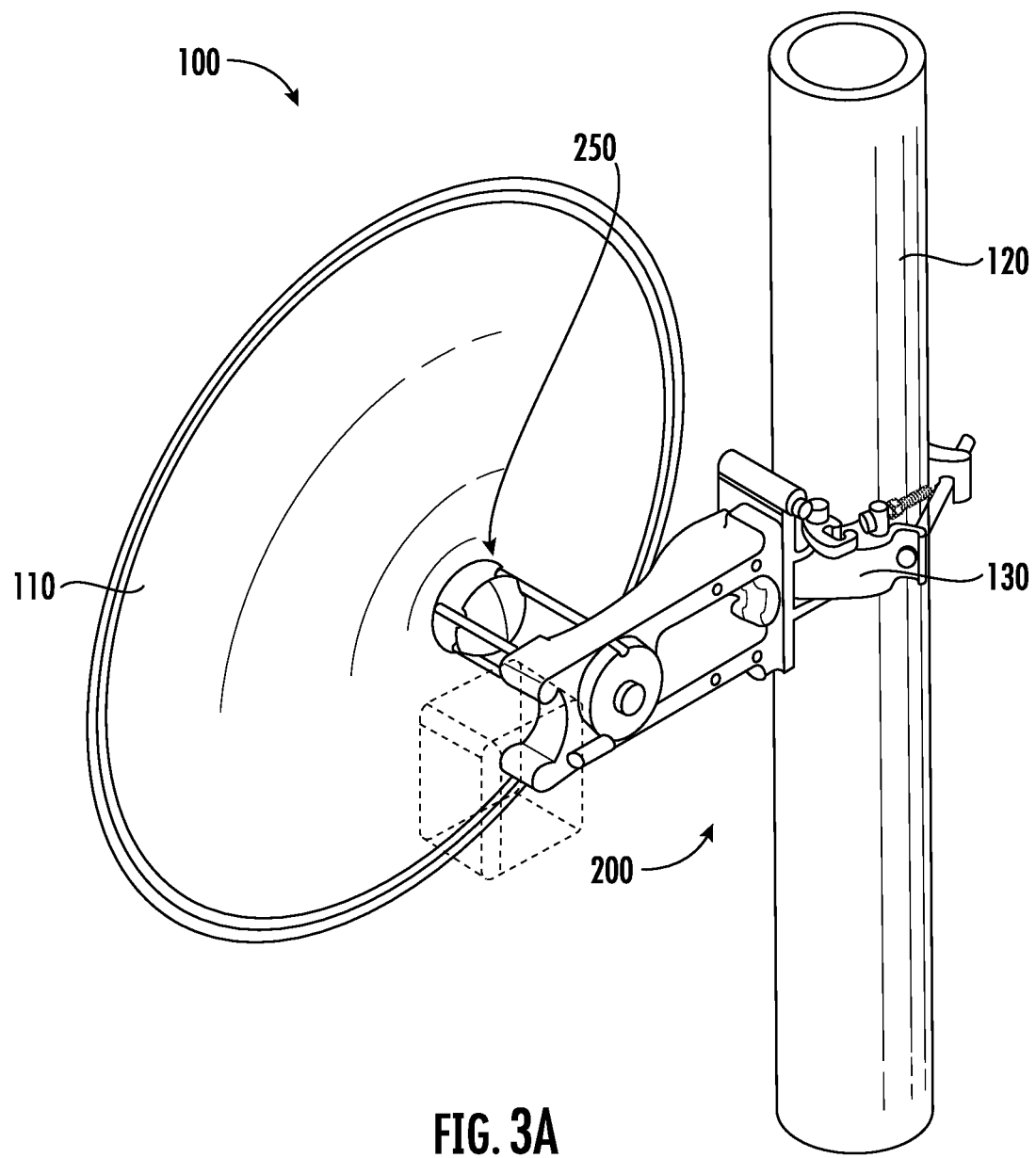
FIG. 3A is a rear perspective view of an antenna assembly according to embodiments of the present invention.
Figure 3B:
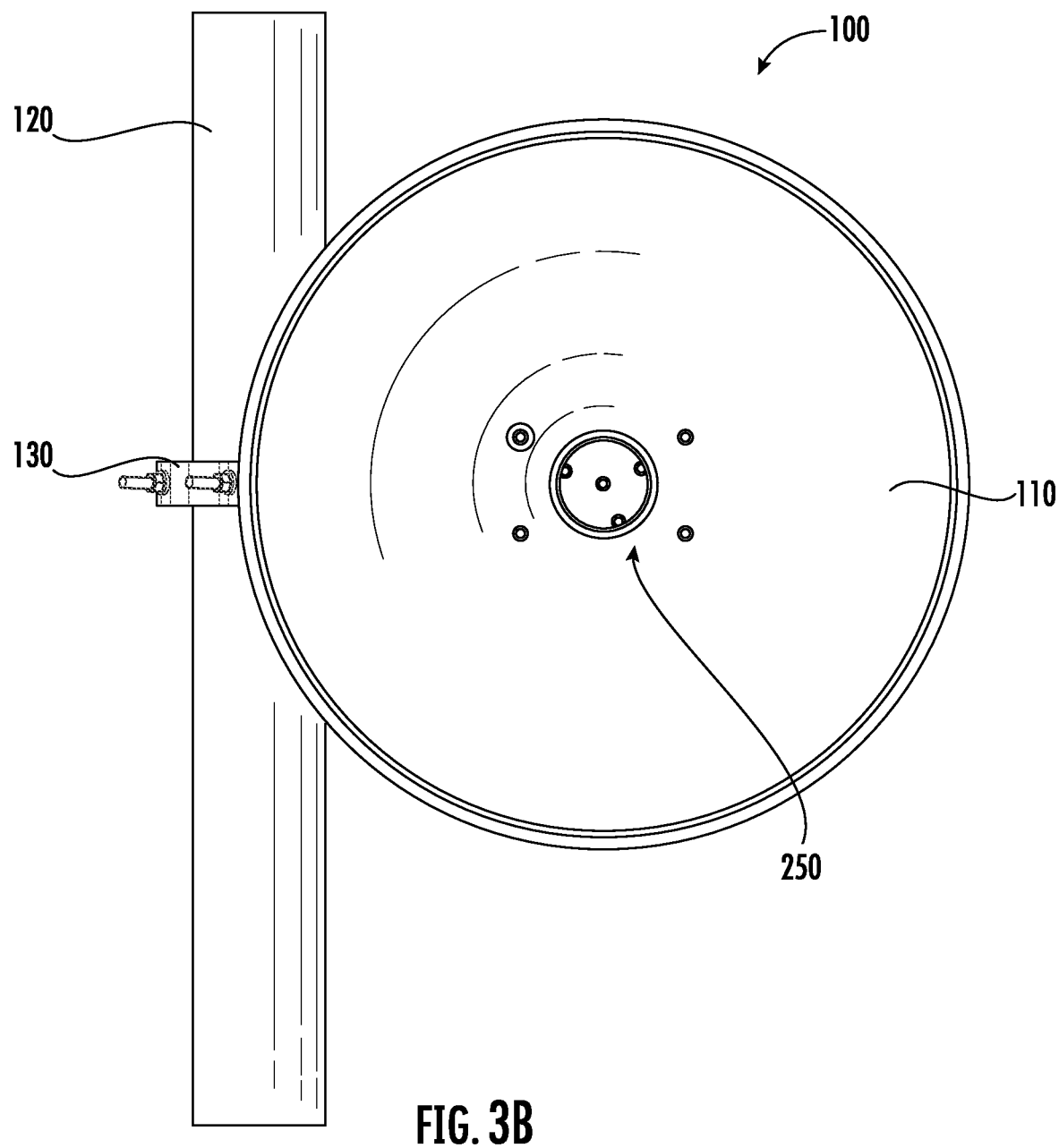
FIG. 3B is a front view of the antenna assembly of FIG. 3A.
Figure 3C:
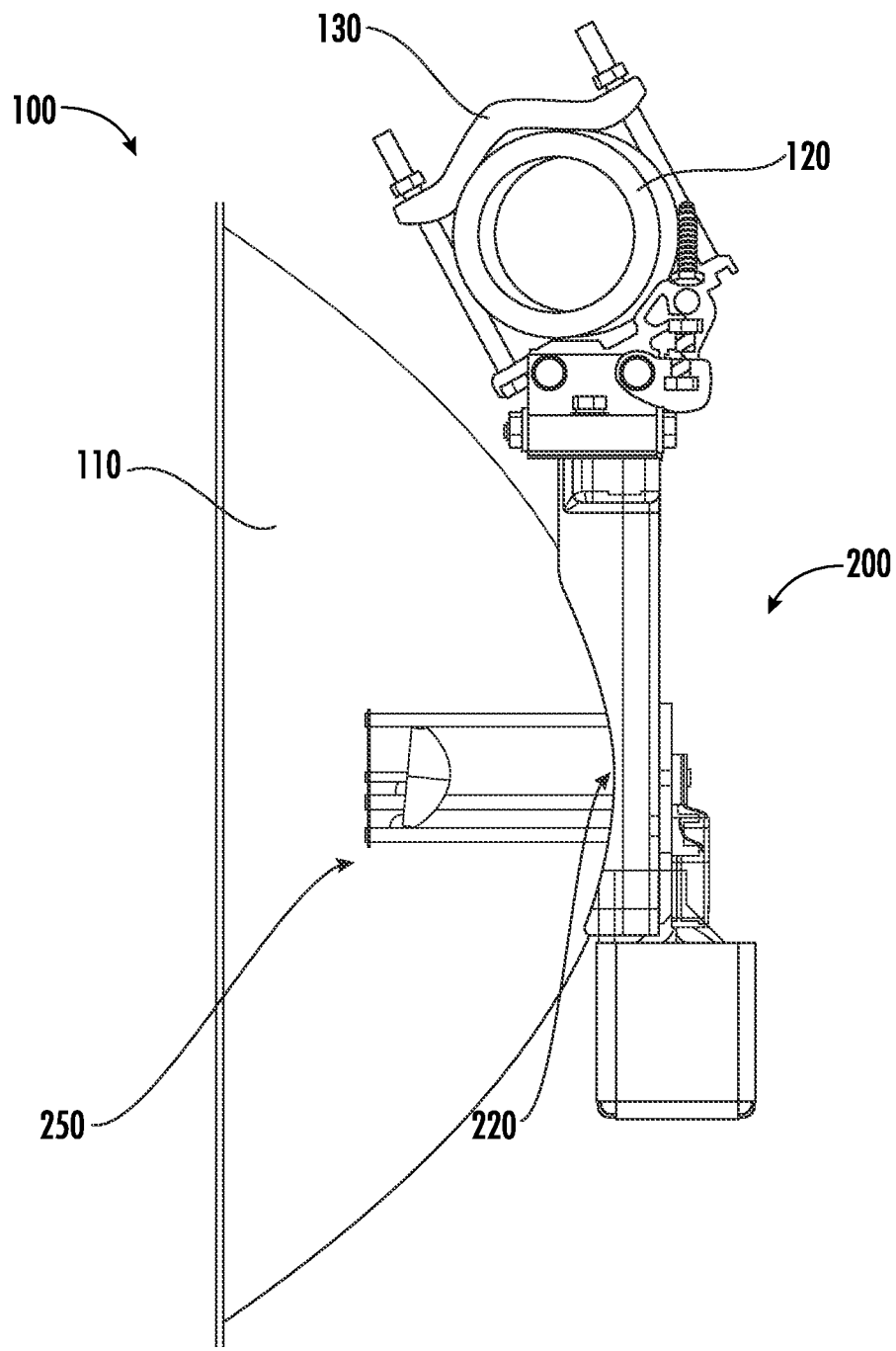
FIG. 3C is a top view of the antenna assembly of FIG. 3A.
Figure 3D:
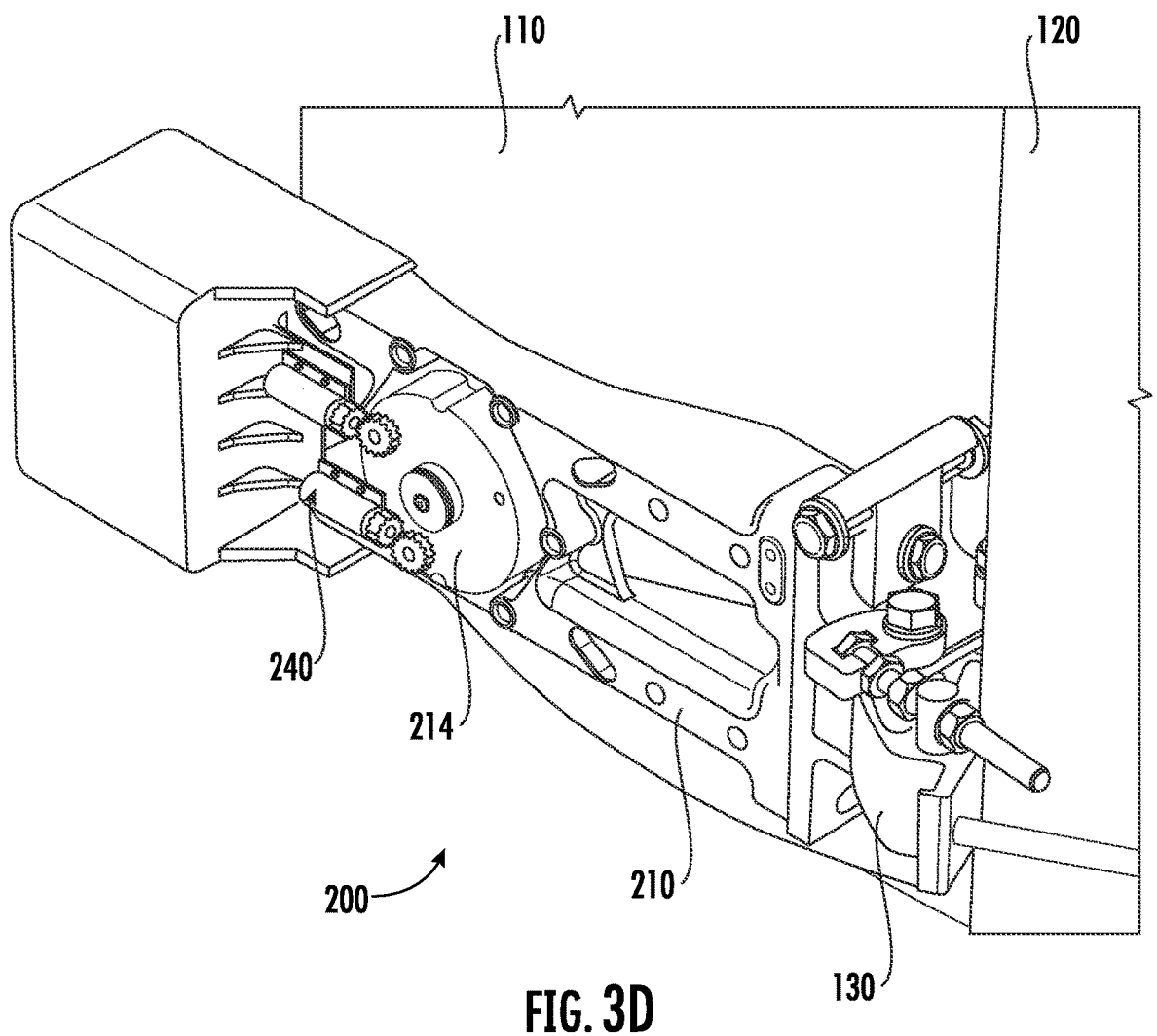
FIG. 3D is an enlarged perspective view of a sub-reflector assembly of the antenna assembly of FIG. 3A.

The sub-reflector assembly 200 is coupled to the main reflector 110. In some embodiments, both the main reflector 110 and the sub-reflector 250 have a parabolic shape. As shown in FIG. 3A, FIG. 3C, and FIG. 3D, the sub-reflector assembly 200 is located behind the main reflector 110 and is configured to adjust the position of the sub-reflector 250, which is located in front of the main reflector 110. As shown in FIGS. 3A-3D, in some embodiments, the antenna assembly 100 may be secured to a mounting structure 120 (e.g., a mounting pole) via a mounting bracket 130 (e.g., a pipe clamp).

Figure 4A:
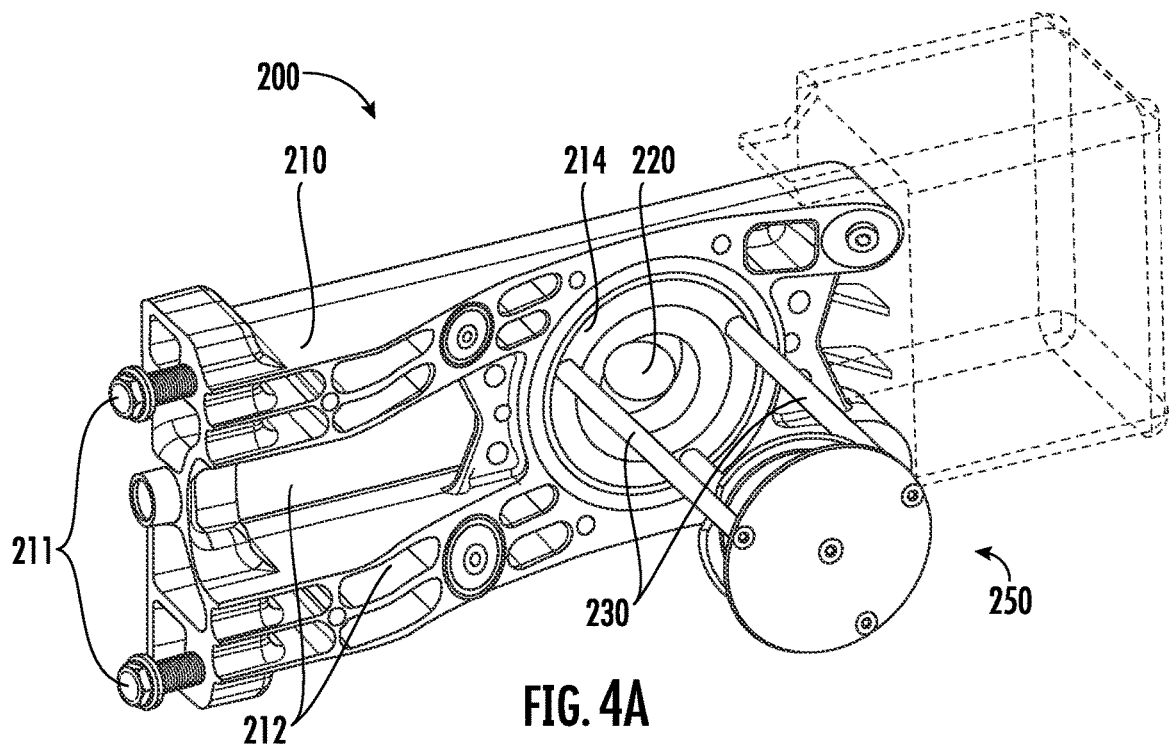
FIG. 4A is a front perspective view the sub-reflector assembly of FIG. 3D according to embodiments of the present invention.
Figure 4B:
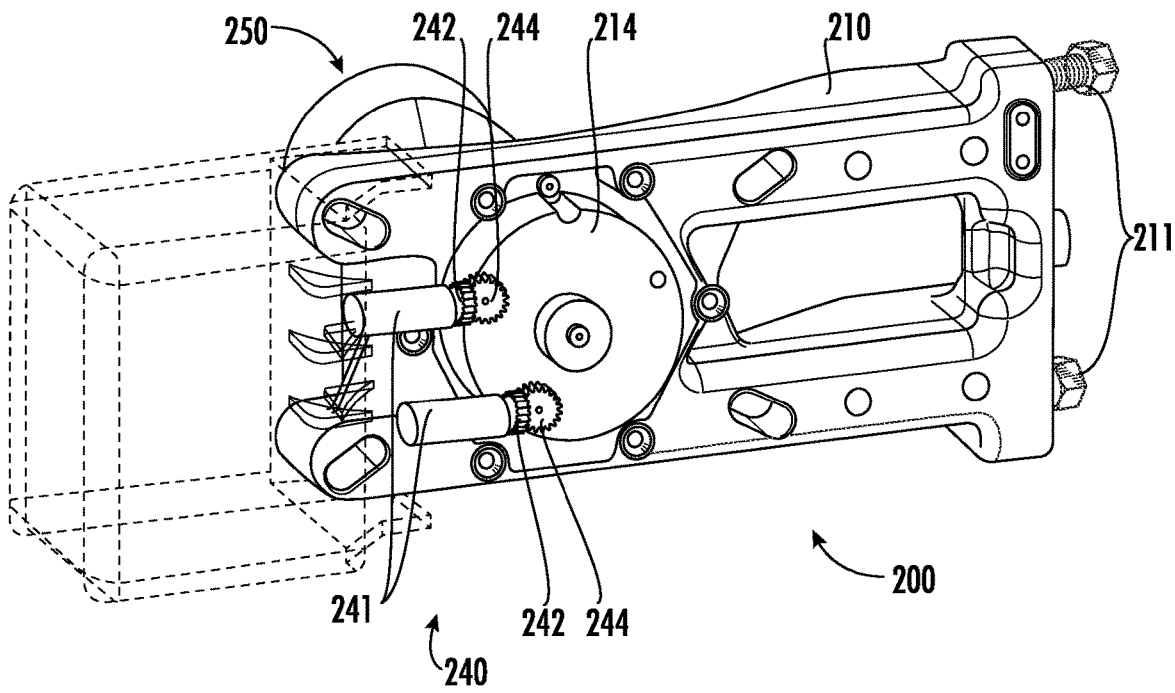
FIG. 4B is a rear perspective view of the sub-reflector assembly of FIG. 4A.

The sub-reflector assembly 200 according to embodiments of the present invention is further illustrated in FIGS. 4A and 4B. Integral to the present invention is the antenna optics and primary feed design, which augments the mechanical approach taken. As shown in FIGS. 4A-4B, the sub-reflector assembly 200 includes a main body 210 and an antenna 220. For example, in some embodiments, the antenna 220 may be secured within the main body 210. In some embodiments, the sub-reflector assembly 200 is configured to receive an antenna housing 214 containing the antenna 220, i.e., the antenna housing 214 is secured to the main body 210. In some embodiments, the antenna 220 may be a lens antenna. Utilizing a lens antenna 220 as the primary feed has the benefit of reducing the size of the sub-reflector 250, while maintaining radio frequency (RF) performance. This is critical to ensure that the feed system can be rear-fed into the antenna. As noted above, this approach also provides several benefits such as a compact design, interchangeability within the field in case of breakdown, and the ability to fit within an existing product envelope.

As shown in FIG. 3D and FIG. 4B, the sub-reflector assembly 200 further includes a drive assembly 240. In some embodiments, the drive assembly 240 may comprise two drive motors 241 and corresponding gear system, i.e., driving gears 242 and driven gears 244 (see also, e.g., FIGS. 7A-7B). As described in further detail below, the drive assembly 240 is coupled to an adjustment mechanism 300 (FIG. 5A) that work together to adjust the position of the sub-reflector 250 relative to the main body 210 to steer an antenna beam of the antenna 220. In some embodiments, the main body 210 of the sub-reflector assembly 200 may comprise a plurality of recesses and/or apertures 212 which help to reduce the overall weight of the assembly 200. The sub-reflector assembly 200 is configured to be secured to the mounting bracket 130 via one or more fasteners 211 (e.g., bolts).

As shown in FIG. 4A and FIGS. 5A-5D, the sub-reflector 250 is positioned in front of the main reflector 110 by a plurality of support members 230. The sub-reflector 250 is coupled to the support members 230 via the adjustment mechanism 300. The sub-reflector 250 is support by at least one support member 230. As shown in the figures, in some embodiments, the sub-reflector assembly 200 may include three (3) support members 230. The three support members 230 may be spaced equally spaced apart from each other (e.g., 120 degrees). In other embodiments, the support members 230 may not be equally spaced apart from each other. In some embodiments, one or more of the support members 230 are hollow. In some embodiments, the support members 230 are solid. In some embodiments, the support members 230 may be rods. Each of the support members 230 may be coupled to, and extend axially outwardly from, the main body 210 of the sub-reflector assembly 200. In some embodiments, the support members 230 may be coupled to the antenna housing 214 and extend axially outwardly therefrom. In some embodiments, a support plate 260 may be secured to a free end of each of the support members 230 via a plurality of fasteners 262 (e.g., hex screws). In some embodiments, the support plate 260 may have a circular or elliptical shape. In some embodiments, a brace member 261 may provide additional structural support to the sub-reflector assembly (see, e.g., FIGS. 11A-15B).

Figure 5A:
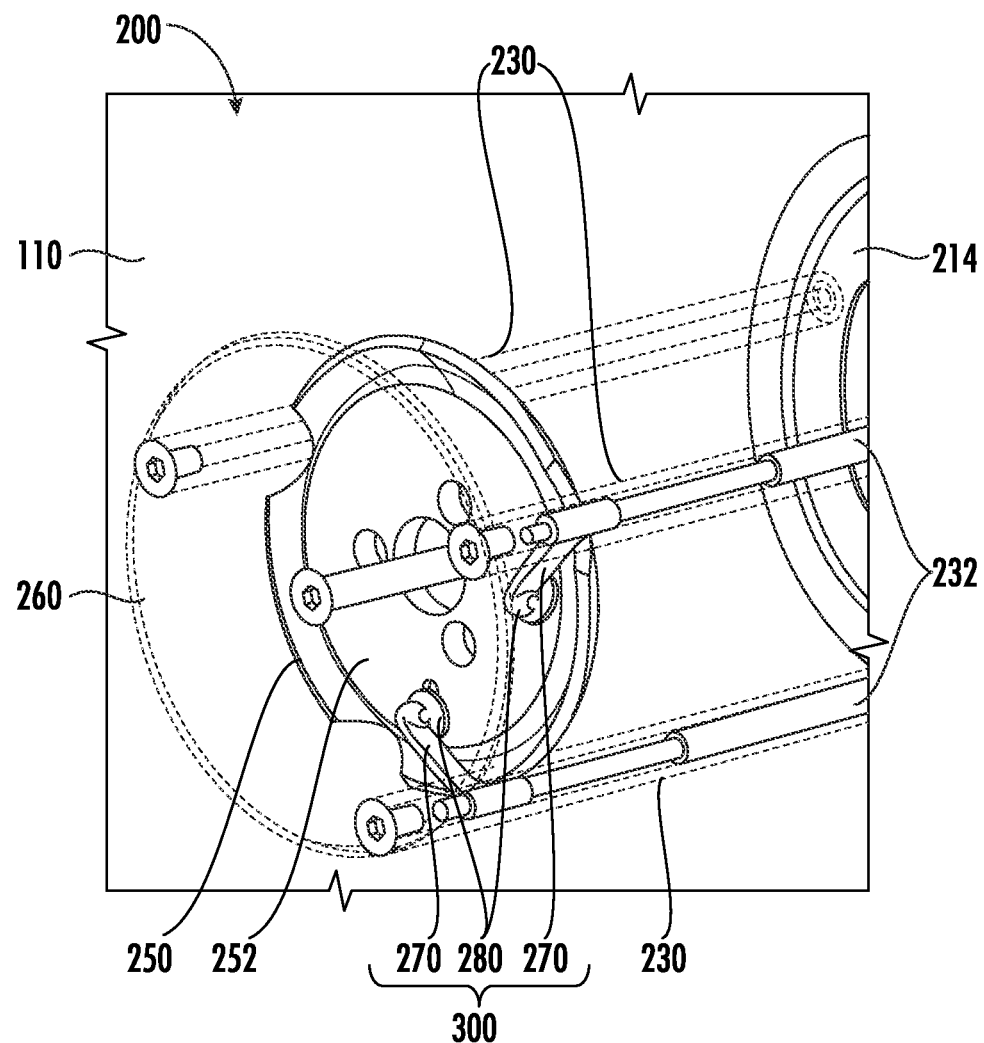
FIG. 5A is a perspective view of a sub-reflector and adjustment mechanism of the sub-reflector assembly of FIG. 4A.
Figure 5B:
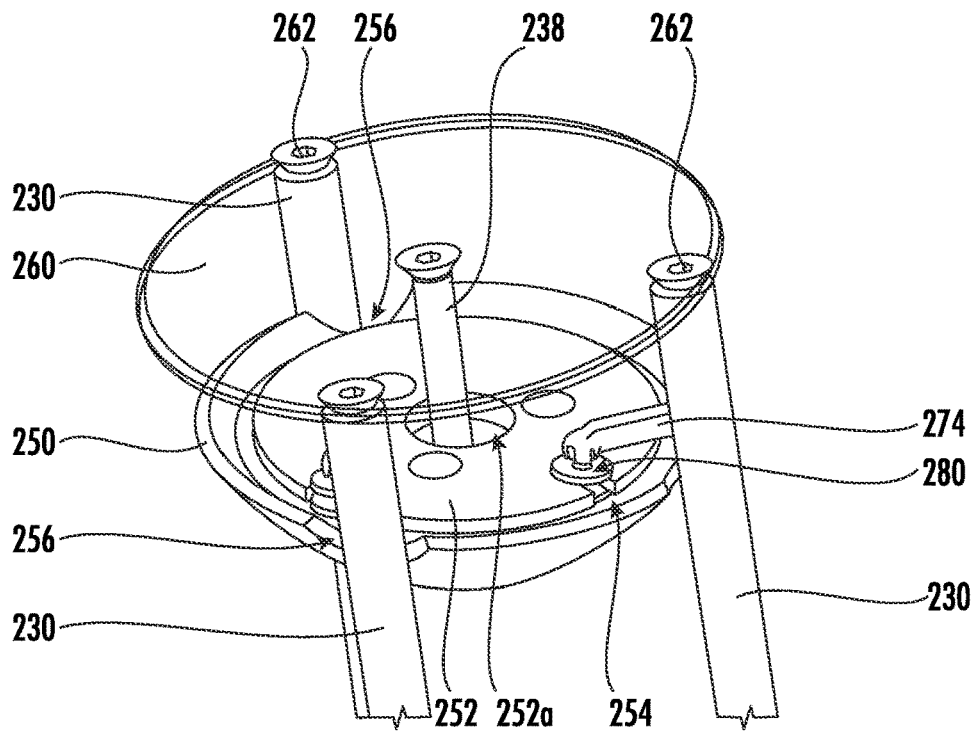
FIGS. 5B-5D are enlarged perspective views of the sub-reflector of FIG. 5A.
Figure 5C:
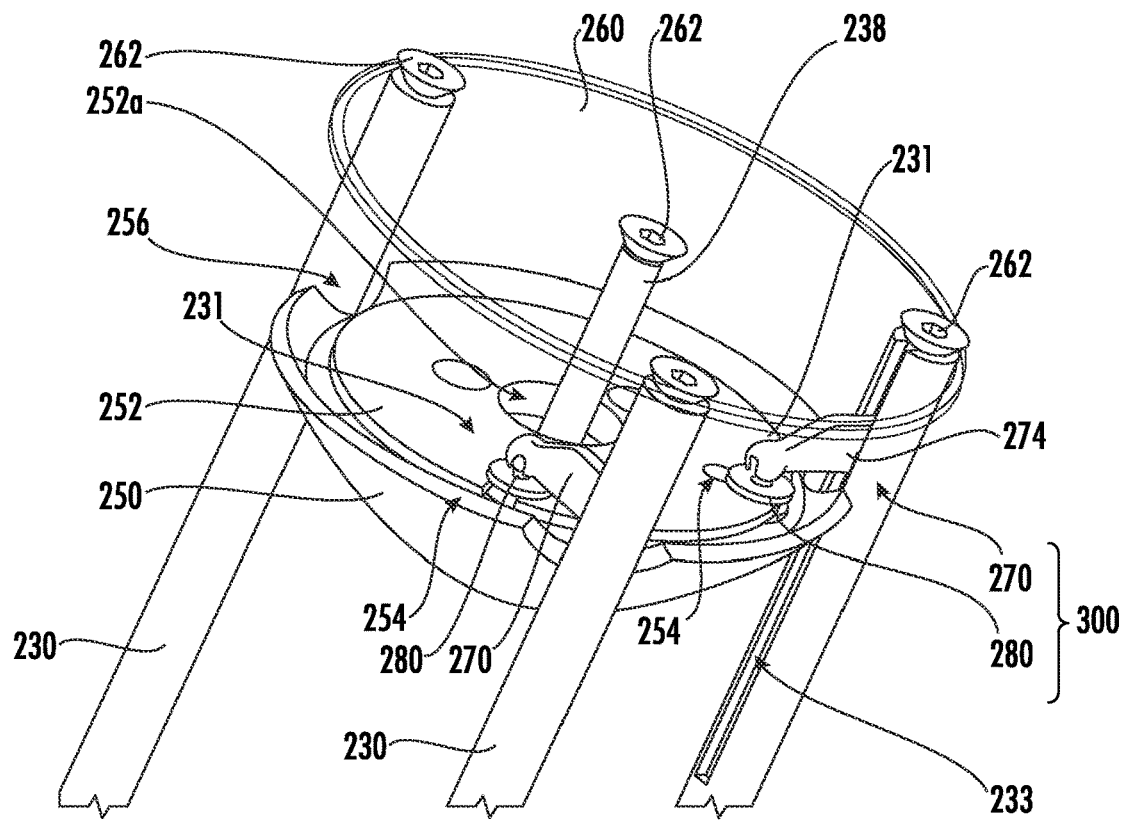

As shown in FIGS. 5A-5C, a cap plate 252 may be secured to the sub-reflector 250. In some embodiments, the cap plate 252 is secured within an inner diameter of the sub-reflector 250. In some embodiments, the cap plate 252 may have a center aperture 252a. In addition, the cap plate 252 may further have at least two slots 254 that are open to and extend radially inwardly from an outer edge of the cap plate 252. As shown in FIGS. 5A-5D, in some embodiments, a fourth support member 238 extends axially outwardly from the center of the sub-reflector 250 and through the center aperture 252a in the sub-reflector cap plate 252. The support member 238 secures the sub-reflector 250 to the support plate 260 via a respective fastener 262. In some embodiments, the fourth support member 238 may be a rod.

Figure 5D:
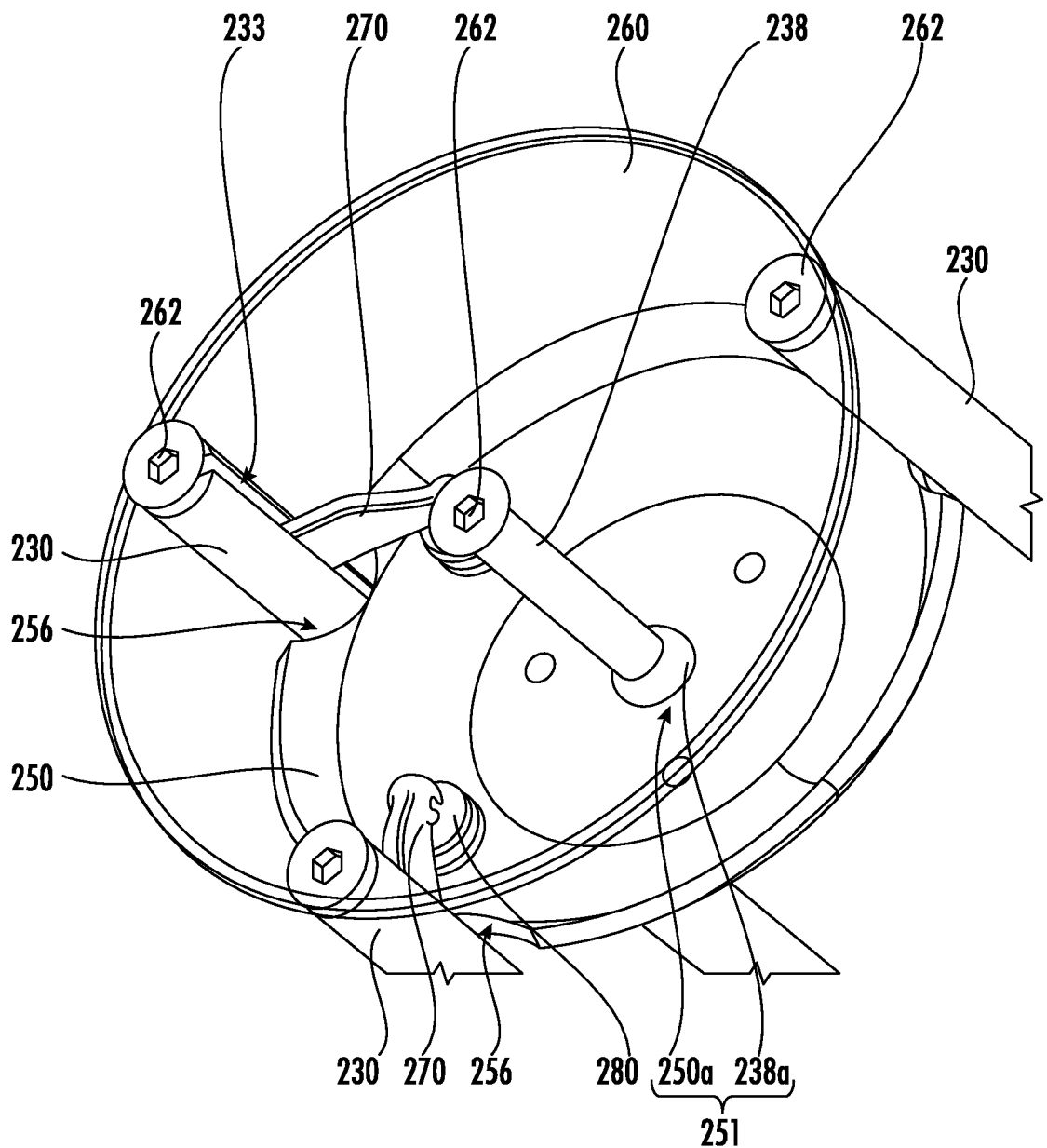

As shown in FIG. 5D, in some embodiments, the fourth support member 238 has a ball joint 238a at the opposing end. The ball joint 238a is configured to be received by a corresponding ball socket 250a in the center of the sub-reflector 250 to form a central ball-and-socket joint 251 (FIG. 5D). As discussed in further detail below, the ball-and-socket joint 251 allows the sub-reflector 250 to pivot and move in response to movement by the adjustment mechanism 300. In some embodiments, the ball-and-socket joint 251 may be replaced with a universal joint 640 (see, e.g., FIGS. 9A-9C). As shown in FIGS. 5C-5D, in some embodiments, the sub-reflector 250 has a plurality of arcuate recesses 256 residing along an outer edge of the sub-reflector 250. Each of the recesses 256 is positioned relative to a corresponding support member 230 and provides sufficient space such that the sub-reflector 250 is allowed to pivot and move without contacting the support members 230.

Figure 6A:
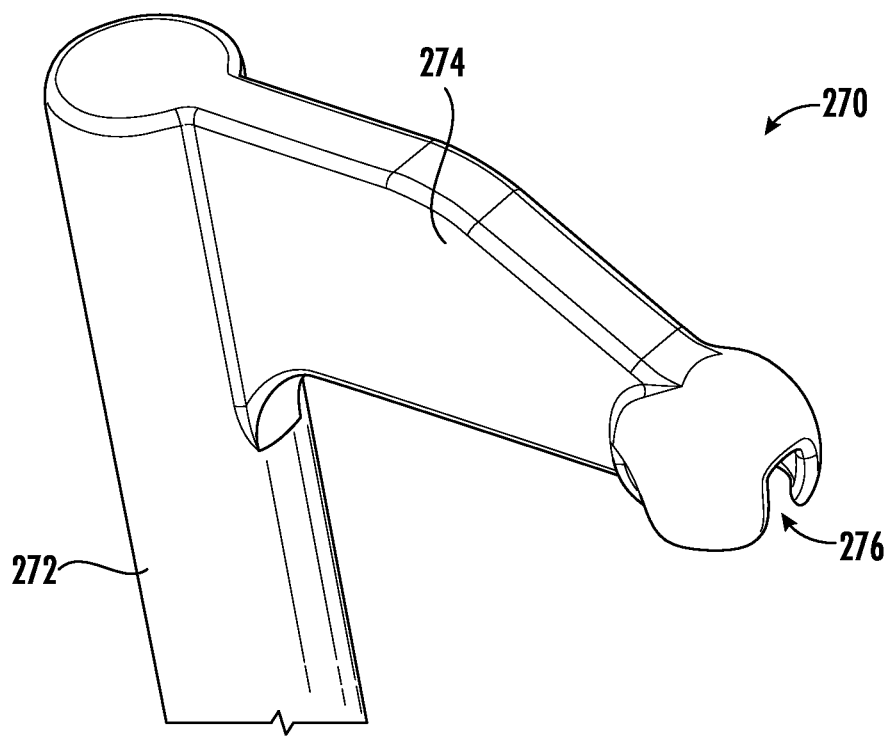
FIG. 6A is an enlarged view of a pivot slider of the adjustment mechanism for the sub-reflector assembly according to embodiments of the present invention.
Figure 6B:
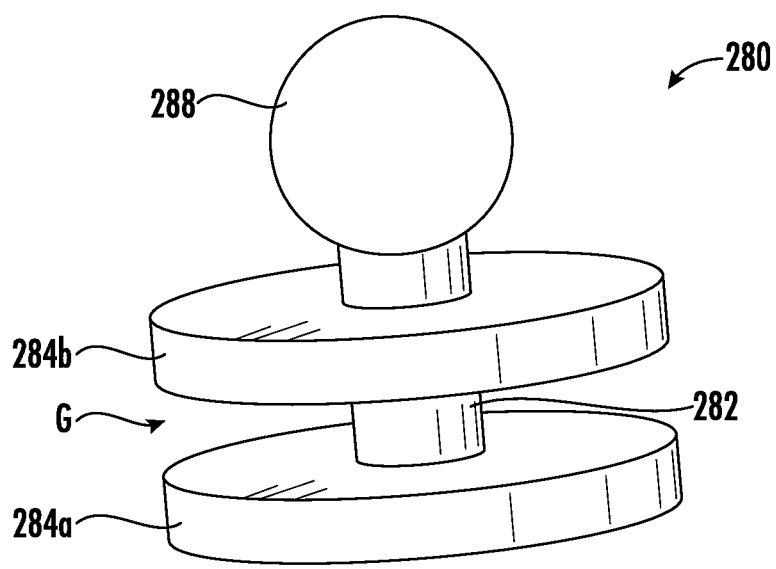
FIG. 6B is perspective view of the ball joint assembly of the adjustment mechanism for the sub-reflector assembly according to embodiments of the present invention.

As shown in FIG. 5A, in some embodiments, the adjustment mechanism 300 comprises at least one pivot slider 270 and corresponding ball joint slider 280. In some embodiments, the adjustment mechanism 300 comprises two pivot sliders 270 and corresponding ball joint sliders 280. FIG. 6A is an enlarged view of an end of a pivot slider 270 according to embodiments of the present invention. FIG. 6B illustrates a ball joint slider 280 according to embodiments of the present invention.

As shown in FIG. 6A, each pivot slider 270 comprises a main body 272. An arm 274 extends outwardly from, and perpendicular to, an upper end of the main body 272 of each pivot slider 270. A ball socket 276 is located at a free end of the arm 274. As shown in FIG. 6B, the ball joint slider 280 comprises a shaft 282 extending through two annular plates 284a, 284b. The ball joint 288 is located at one end of the shaft 282. The annular plates 284a, 284b are positioned parallel to each other with an annular gap G therebetween and circumferential to the shaft 282. Each ball joint slider 280 is configured to be received by a respective slot 254 in the cap plate 252, i.e., the shaft 282 of the ball joint slider 280 is received within the slot 254 with the cap plate 252 positioned between the annular plates 284a, 284b. In addition, the ball socket 276 of a pivot slider 270 is configured to receive the ball joint 288 of the ball joint slider 280 forming a second ball-and-socket joint 301. See FIG. 6B; see also FIGS. 5A-5D. Thus, the ball joint slider 280 is configured to pivot (i.e., about ball-and-socket joint 301) and slide (i.e., within slot 254) in response to movement by the pivot slider 270 which results in movement of the sub-reflector 250.

Figure 7A:
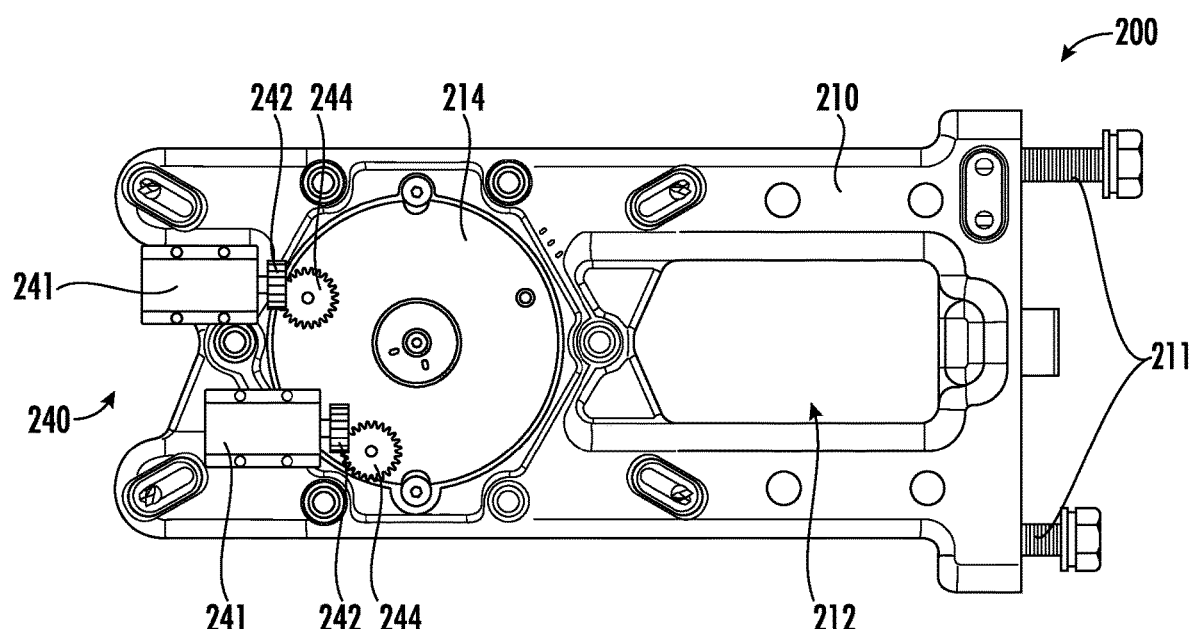
FIG. 7A is a rear view of the sub-reflector assembly of FIG. 4A.
Figure 7B:
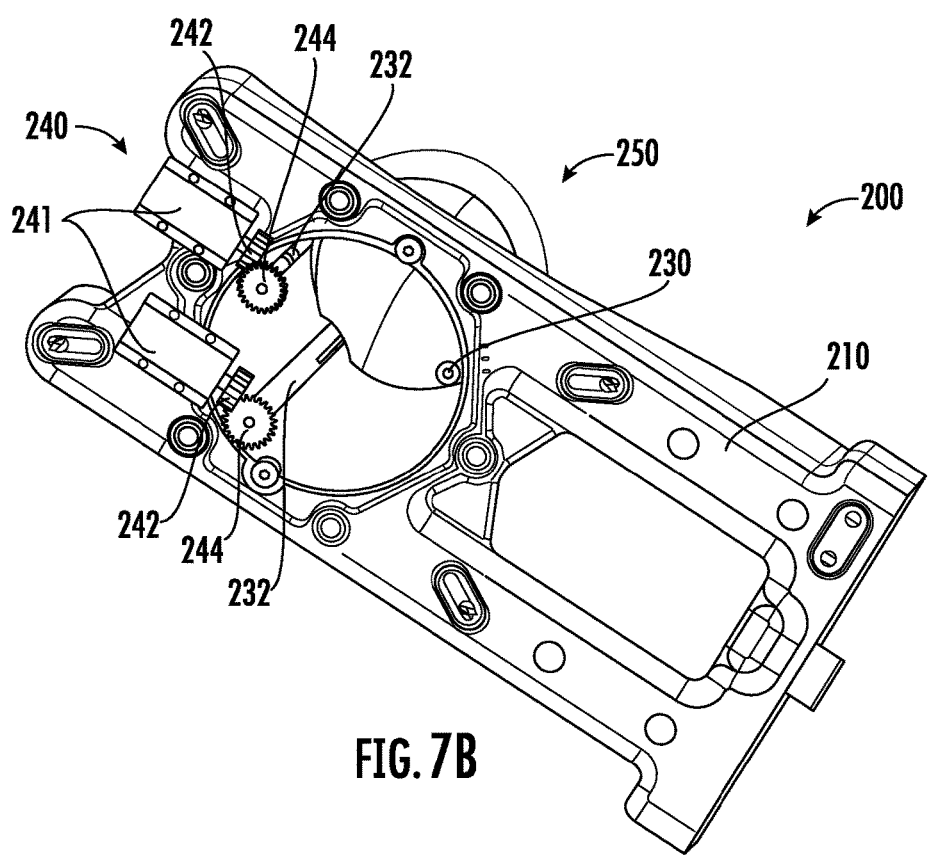
FIG. 7B is a rear perspective view of the sub-reflector assembly of FIG. 4A.

Referring back to FIG. 5A, each pivot slider 270 is secured within a respective hollow support member 230 and coupled to one end of a driving strut 232 (which is also secured within the support member 230). In some embodiments, pivot sliders 270 are secured within two of the support members 230. The third support member 230 may provide structural support to the sub-reflector 250. The opposing end of each driving strut 232 comprises a driven gear 244 (see, e.g., FIG. 3B and FIGS. 7A-7B). As shown in FIGS. 7A-7B, the driven gear 244 engages a corresponding driving gear 242 which is controlled by a drive motor 241. In some embodiments, the drive motor 241 may be a stepper motor. In some embodiments, the main body 272 of the pivot slider 270 comprises internal threads (not shown) that correspond with threads (not shown) on the driving strut 232 to form a worm gear configuration. It is noted that other known gear systems such as rack and pinion (see, e.g., FIGS. 8A-8B), lead screw or the like would also work in place of the worm gear configuration.

As shown in FIGS. 5B-5C, the arms 274 of the pivot sliders 270 extend radially inward from the support members 230. Each arm 274 is configured to extend through a slot 233 in the respective support member 230 (FIG. 5C) which allows the pivot sliders 270 to move axially relative to their respective support members 230. The ball socket 276 of the pivot slider 270 engages the ball joint 288 of a corresponding ball joint slider 280 which is also received within a slot 254 of the cap plate 252. Each ball joint slider 280 is configured to slide within its respective slot 254, and pivot about the ball-and-socket joint 301, in response to linear movement of the corresponding pivot slider 270.

In operation, a signal is sent to the drive assembly 240 (e.g., wirelessly) which controls the drive motors 241 and corresponding gear system (i.e., driving gears 242 and driven gears 244). The driving struts 232 rotate in response to the drive assembly 240 (i.e., the drive motors 241 rotate their respective driving gears 242, which in turn rotate the corresponding driven gears 244 coupled to an end of the driving structs 232). As one or both of the driving struts 232 rotate, the corresponding pivot slider(s) 270 move in a linear direction (i.e., axially with respect to the corresponding driving strut 232). For example, when the driving strut 232 rotates in a clockwise direction (e.g., when the corresponding driven gear 242 rotates in a clockwise direction), the corresponding pivot slider 270 will move in a first linear direction (i.e., axially with respect to the corresponding driving strut 232). The arms 274 of the pivot sliders 270 will slide within their respective slots 233 in the support members 230. When the driving strut 232 rotates in a counter-clockwise direction (e.g., when the corresponding driven gear 242 rotates in a counter-clockwise direction), the corresponding pivot slider 270 will move in a second opposite linear direction (i.e., axially with respect to the corresponding driving strut 232). Thus, rotational movement of the driving struts 232 (and corresponding driven gears 242) translate into linear (or axial) movement of the pivot slider 270.

The sub-reflector 250 is configured to pivot relative to the linear movement of the pivot sliders 270 to adjust the direction of the antenna beam of the antenna 220. As noted above, each ball socket 276 of the pivot slider 270 is configured to receive the ball joint 288 of a respective ball joint slider 280, thereby creating a ball-and-socket joint 301. As the pivot slider 270 moves linearly (relative to a support member 230), the ball joint slider 280 is configured to pivot (i.e., about the ball-and-socket joint 301) and slide within the corresponding slot 254 in the cap plate 252 which is coupled to the sub-reflector 250 (FIGS. 5B-5C). As the ball joint sliders 280 pivot and slide in response to the linear movement of the corresponding pivot sliders 270, the sub-reflector 250 pivots about the ball-and-socket joint 251 created by the ball joint 238a of support member 238 and the ball socket 250a of the sub-reflector 250, i.e., about a center of rotation (see, e.g., FIG. 5D and FIG. 17). Through movement of the pivot sliders 270 and ball joint sliders 280, the position of the sub-reflector 250 can be adjusted relative to the main body 210 of the sub-reflector assembly 200 to steer the beam direction of the antenna 220.

Alternative sub-reflector assemblies and/or adjustment mechanisms according to embodiments of the present invention are illustrated in FIGS. 8A-15C. Properties and/or features of the sub-reflector assemblies and adjustment mechanisms illustrated in FIGS. 8A-15C may be as described above in reference to the sub-reflector assembly 200 and adjustment mechanism 300 described herein with reference to FIGS. 3A-7B and duplicate discussion thereof may be omitted herein for the purposes of discussing FIGS. 8A-15C.

Figure 8A:
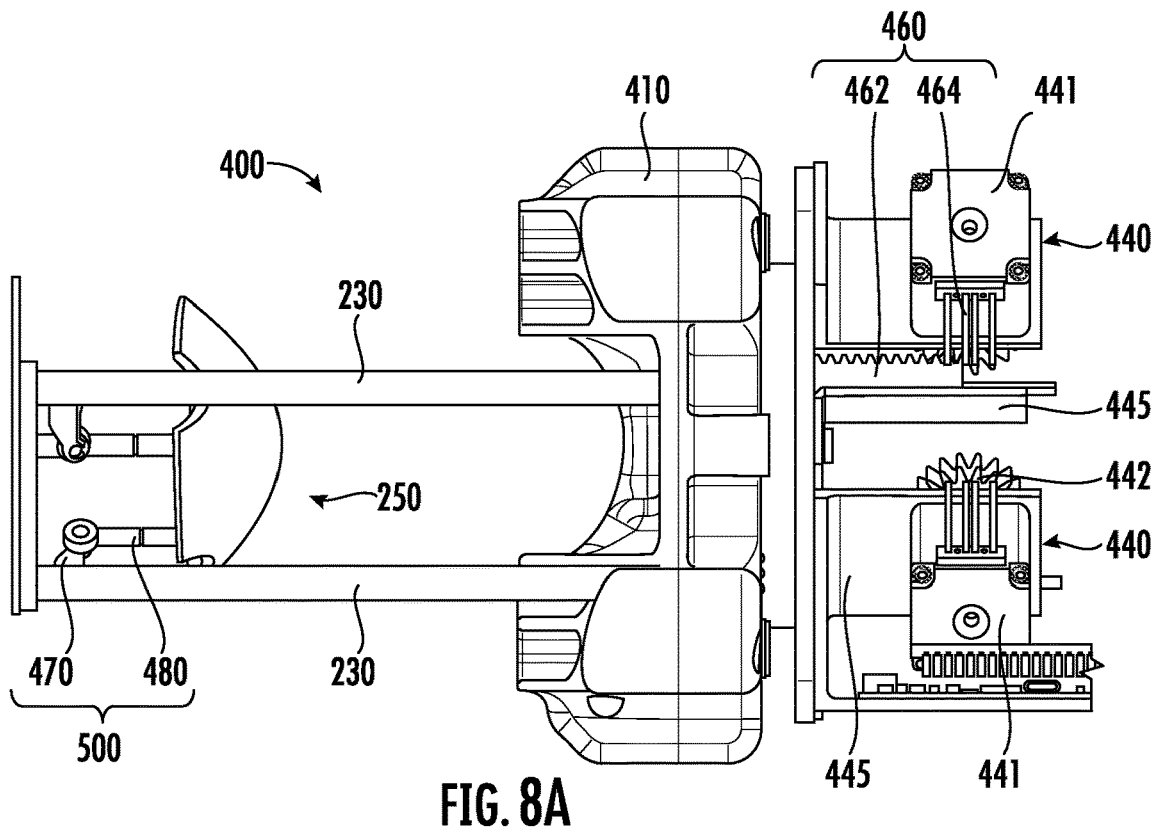
FIG. 8A is a side view of an alternative sub-reflector assembly according to embodiments of the present invention.
Figure 8B:
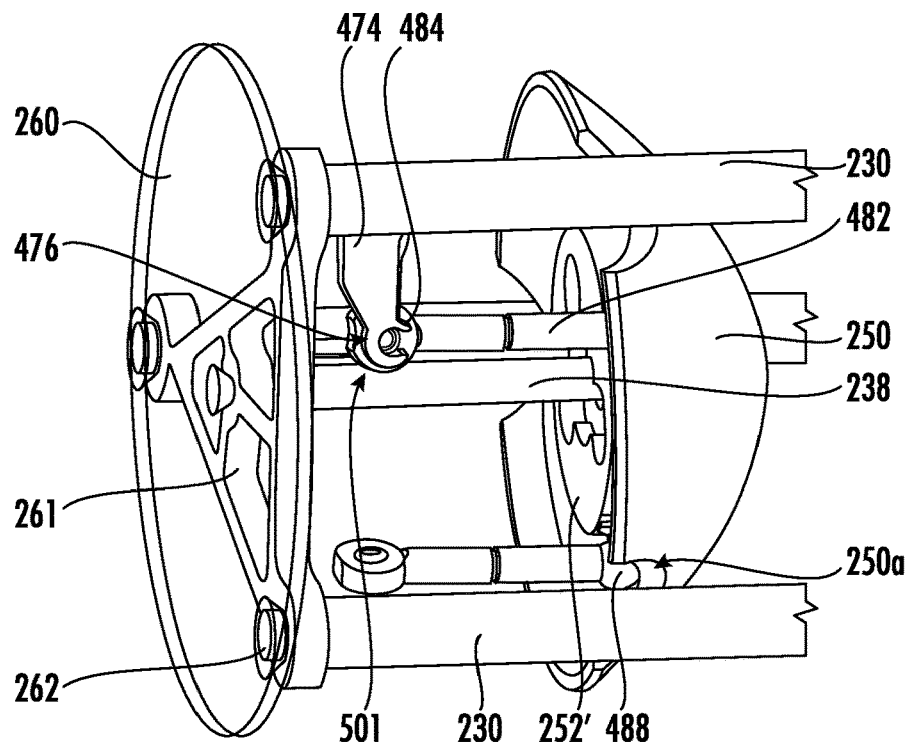
FIG. 8B is an enlarged perspective view of the sub-reflector and adjustment mechanism for the sub-reflector assembly of FIG. 8A.

Referring to FIGS. 8A-8B, alternative sub-reflector assembly 400 and corresponding adjustment mechanism 500 are illustrated. Similar to the sub-reflector assembly 200 described herein, sub-reflector assembly 400 includes two drive assemblies 440 that reside behind the main reflector. The sub-reflector assembly 400 differs from the sub-reflector assembly 200 in that the adjustment mechanism 500 includes a double ball joint linkage 480 connecting the pivot sliders 470 to the sub-reflector 250 (see, e.g., FIG. 8B). As shown in FIG. 8B, the arm 474 of each pivot slider 470 includes an attachment member 476 (e.g., a C-shaped latch or hook) that engages a ball joint or pin 484 extending from one end of the linkage 480, creating a pivotable joint 501. At the opposing end of the linkage 480 is a ball joint 488 that is received within a ball socket 250a of the sub-reflector 250, thereby creating a ball-and-socket joint 251. Similar to sub-reflector assembly 200, in some embodiments, a fourth support member 238 having a ball joint 238a is received by a corresponding ball socket 250a in the center of the sub-reflector 250 to form a ball-and-socket joint 251 (see also, e.g., FIG. 5D).

In addition, the sub-reflector assembly 400 may utilize different drive assemblies 440 than previously described. For example, as shown in FIG. 8A, the drive assemblies 440 may comprise a drive motor 441 (e.g., a stepper motor) coupled to a gear rack and pinion system 460 (e.g., rack 462 and pinion 464). The rack 462 of the gear system 460 is coupled to a corresponding driving strut 232 within the support rod 230.

In operation, a signal is sent to one or both drive assemblies 440 (e.g., wirelessly) which controls the drive motors 441 and corresponding gear system 460. The driving struts 232 move in response to the respective drive assemblies 440. The drive motors 441 rotate their respective pinion gears 644, which in turn move the corresponding gear racks 644, and driving struts coupled thereto, in a linear direction. As one or both of the driving struts 232 move, the corresponding pivot slider(s) 470 move in the same linear direction (i.e., axially with respect to the corresponding driving strut 232). Similar to sub-reflector assembly 200, the arms 474 of the pivot sliders 470 for sub-reflector assembly 400 will slide within respective slots 233 in the support members 230.

The sub-reflector 250 is configured to pivot relative to the linear movement of the pivot sliders 470 to adjust the direction of the antenna beam of the antenna 220. As the pivot slider 470 moves linearly (relative to a support member 230), the double ball joint linkage 480 is configured to pivot (i.e., about their respective pivotable joints 501). As the double ball joint linkages 480 pivot in response to the linear movement of the corresponding pivot sliders 470, the sub-reflector 250 pivots about the ball-and-socket joint created by the ball joint 238a of support member 238 and the ball socket 250a of the sub-reflector 250, i.e., about a center of rotation (see, e.g., FIG. 17). Through movement of the pivot sliders 470 and ball joint sliders 480, the position of the sub-reflector 250 can be adjusted relative to the main body 410 of the sub-reflector assembly 400 to steer the beam direction of the antenna.

Figure 9A:
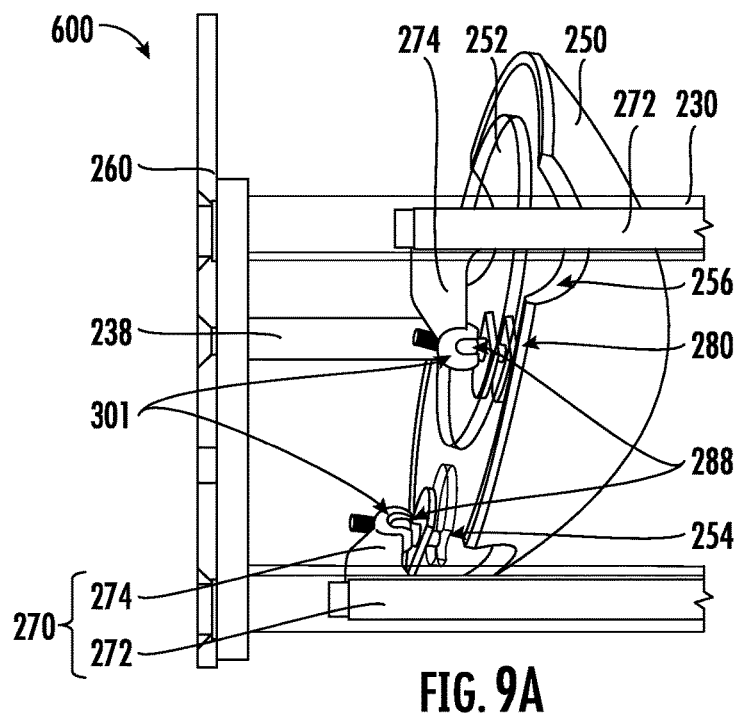
FIG. 9A is a side view of an alternative sub-reflector and adjustment mechanism utilizing a universal joint according to embodiments of the present invention.
Figure 9B:
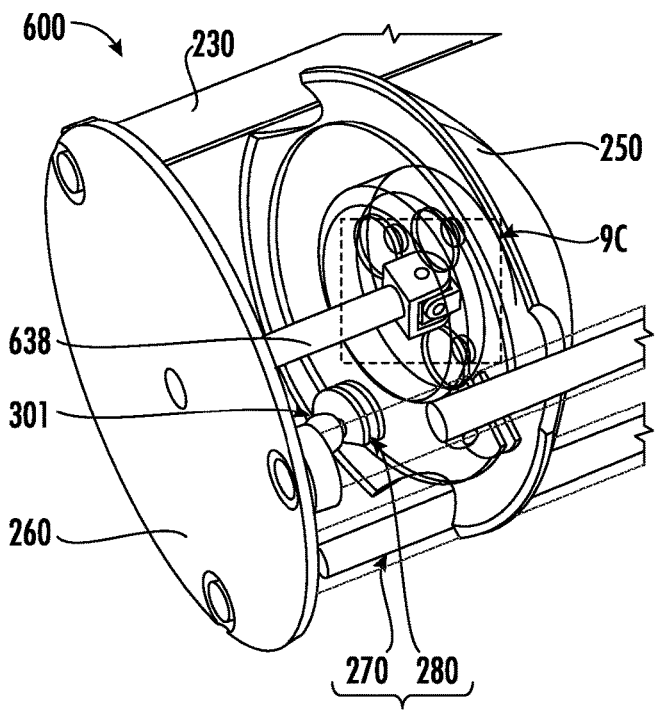
FIG. 9B is a perspective view of the sub-reflector and adjustment mechanism of FIG. 9A.
Figure 9C:
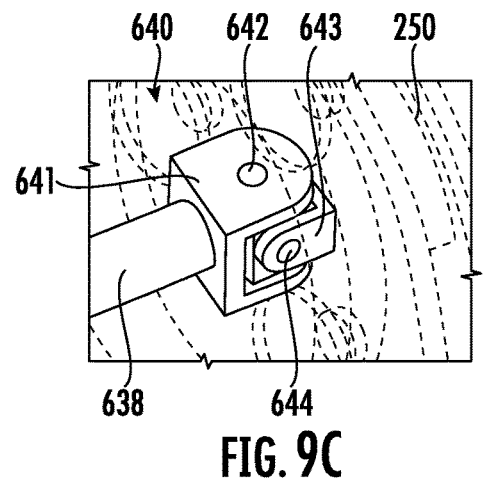
FIG. 9C is an enlarged view of the central universal joint according to embodiments of the present invention.

Referring now to FIGS. 9A-9C, alternative sub-reflector assembly 600 is illustrated. Sub-reflector assembly 600 is the same as sub-reflector assembly 200 described herein except the central ball-and-socket joint 251 in sub-reflector assembly 200 (i.e., created by the ball joint 238a of support member 238 and the ball socket 250a of the sub-reflector 250) is replaced with a universal joint 640 (see, e.g., FIGS. 9B-9C). As shown in FIG. 9C, the universal joint 640 resides at an end of a center support member 638 (e.g., the fourth support member) and is coupled to the center of the sub-reflector 250. In some embodiments, the universal joint 640 may comprise a first member 641 coupled to the end of the center support member 638 and a second member 643 coupled to the sub-reflector 250. The first and second members 641, 643 of the universal joint 640 may be coupled together via a pair of rotating shafts 642, 644 which intersect. The first and second members 641, 643 are able to pivot relative to each other about their respective shafts 642, 644, thereby allowing the sub-reflector 250 to be adjusted relative to the main body of the sub-reflector assembly 600 to steer the beam direction of the antenna 220. The universal joint 640 may prevent unwanted rotation of the sub-reflector 250 while still allowing a full range of rotation (see, e.g., FIG. 17).

Figure 10A:
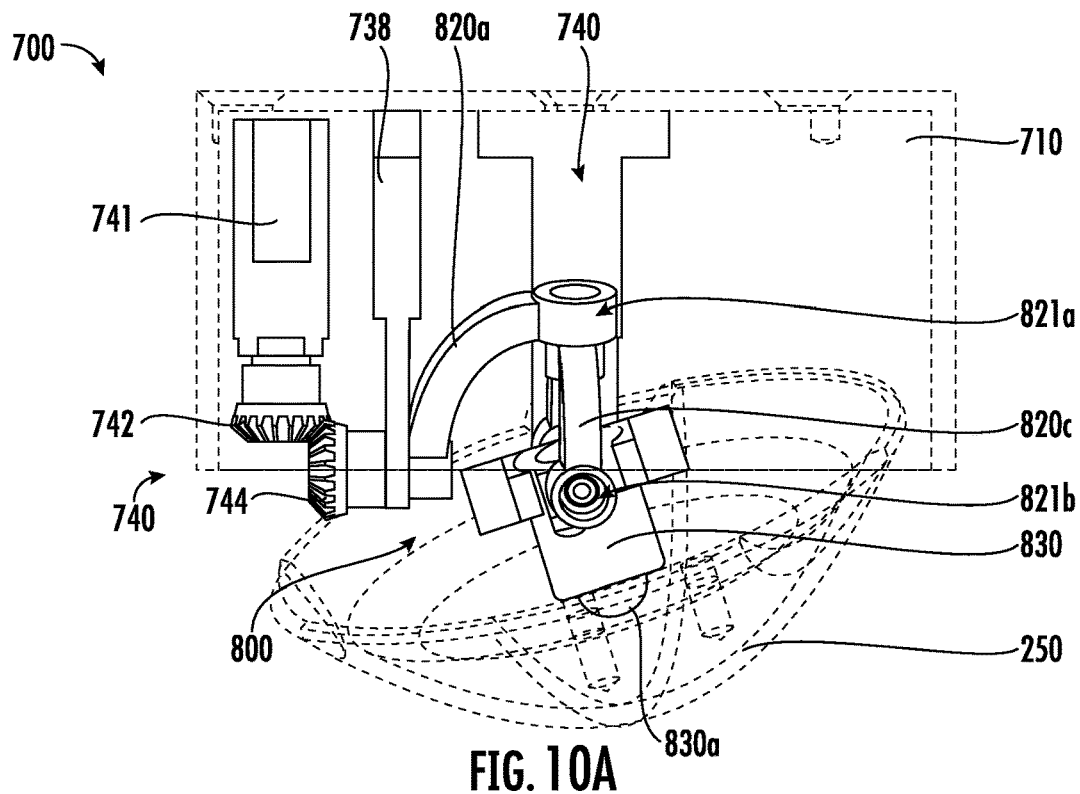
FIG. 10A is a side view of an alternative sub-reflector and adjustment mechanism utilizing Agile Eye mechanics according to embodiments of the present invention.
Figure 10B:
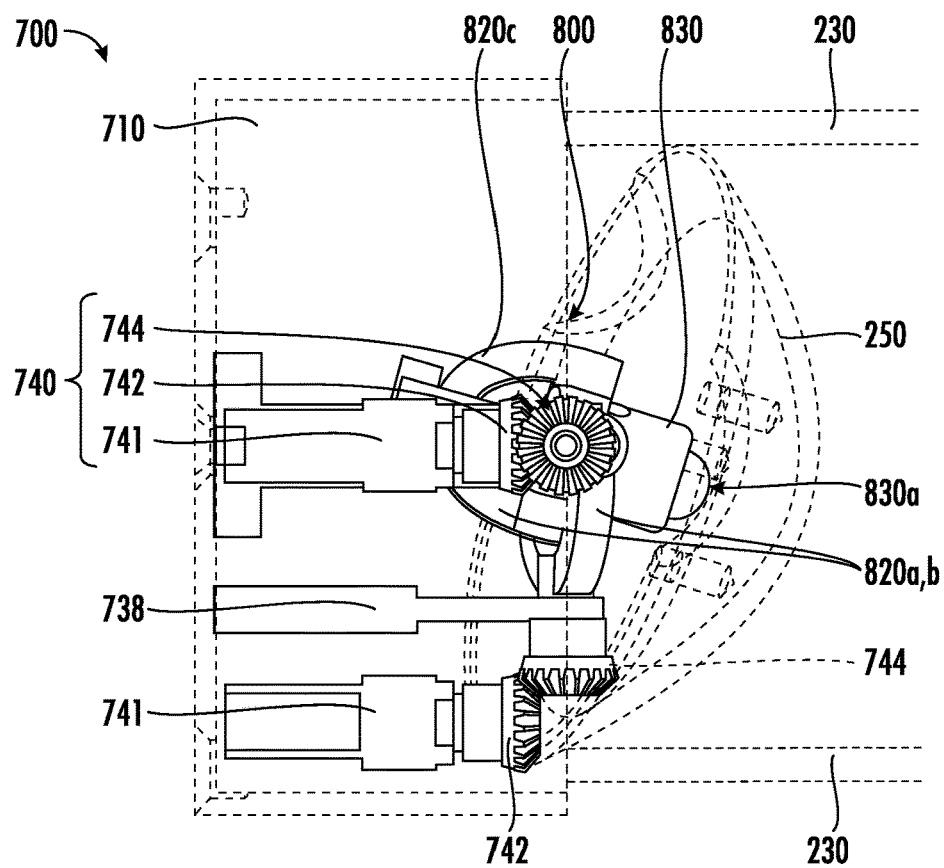
FIG. 10B is another side view of the sub-reflector and adjustment mechanism of FIG. 10A.

Referring now to FIGS. 10A-10B, an alternative sub-reflector assembly 700 is illustrated which utilizes an adjustment mechanism 800 that functions in a similar manner as an "Agile Eye" arrangement (i.e., a three-legged spherical parallel mechanism with rotating joints in which all pairs of adjacent joint axes are orthogonal). The sub-reflector assembly 700 further differs from sub-reflector assembly 200 described herein in that the complete sub-reflector assembly 700 is located in front of the main reflector with the sub-reflector 250. The sub-reflector assembly 700 includes a housing 710 that is positioned in front of the main reflector by a plurality of support members 230 coupled to and extending axially outwardly from the main reflector. The sub-reflector 250 is coupled to the housing 710 via the adjustment mechanism 800 and corresponding drive assembly 740.

As shown in FIGS. 10A-10B, the adjustment mechanism 800 comprises three legs 820 coupled together via a first rotating joint 821a. Two of the legs 820 are each coupled to a respective drive assembly 740. The third leg 820 is coupled to a base member 830 via a second rotating joint 821b. The base member 830 is coupled to the sub-reflector 250 (e.g., at 830a). As shown in FIG. 10B, each drive assembly 740 comprises a drive motor 741, a drive gear 742, and a driven gear 744. Each driven gear 744 is coupled to a respective leg 820a, 820b of the adjustment mechanism 800. In some embodiments, a support member 738 may provide further support to the adjustment mechanism 800 and corresponding drive assemblies 740 within the housing 710 of the sub-reflector assembly 700.

In operation, a signal is sent to one or both drive assemblies 740 (e.g., wirelessly) which controls the drive motors 741 and corresponding gears 742, 744. The legs 820a, 820b coupled to the driven gears 744 move (i.e., pivot and/or rotate) in response to the respective drive assemblies 740. As one or both of the legs 820a, 820b move, the third leg 820c pivots and/or rotates the base member 830 (i.e., similar mechanics as an "Agile Eye" arrangement) which is coupled to the sub-reflector 250. The sub-reflector 250 is configured to pivot relative to the movement of the legs 820a-c to adjust the direction of the antenna beam of the antenna 220. As the legs 820a-c pivot and/or rotate, the sub-reflector 250 pivots about point 830a, i.e., about a center of rotation (see, e.g., FIG. 17). Through movement of the legs 820a-c, the position of the sub-reflector 250 can be adjusted relative to the main reflector to steer the beam direction of the antenna.

Figure 11A:
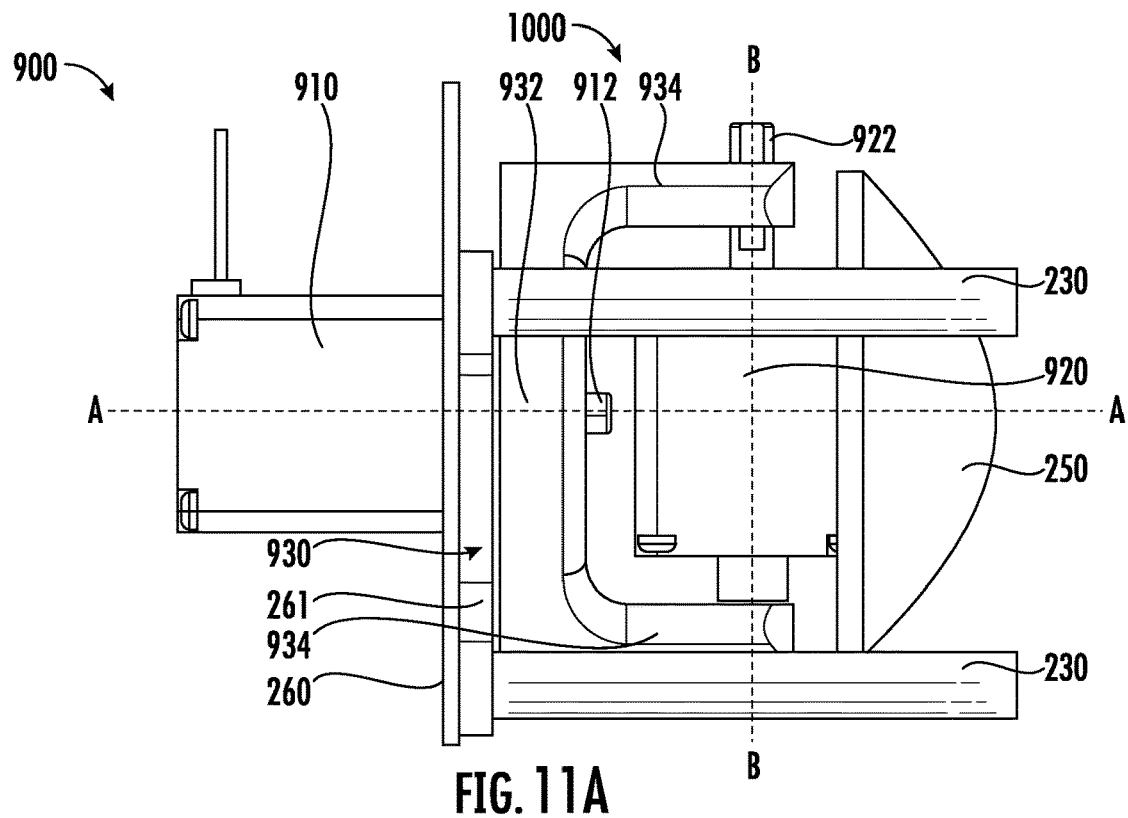
FIG. 11A is a side view of an alternative sub-reflector and adjustment mechanism utilizing a gimbal design according to embodiments of the present invention.
Figure 11B:
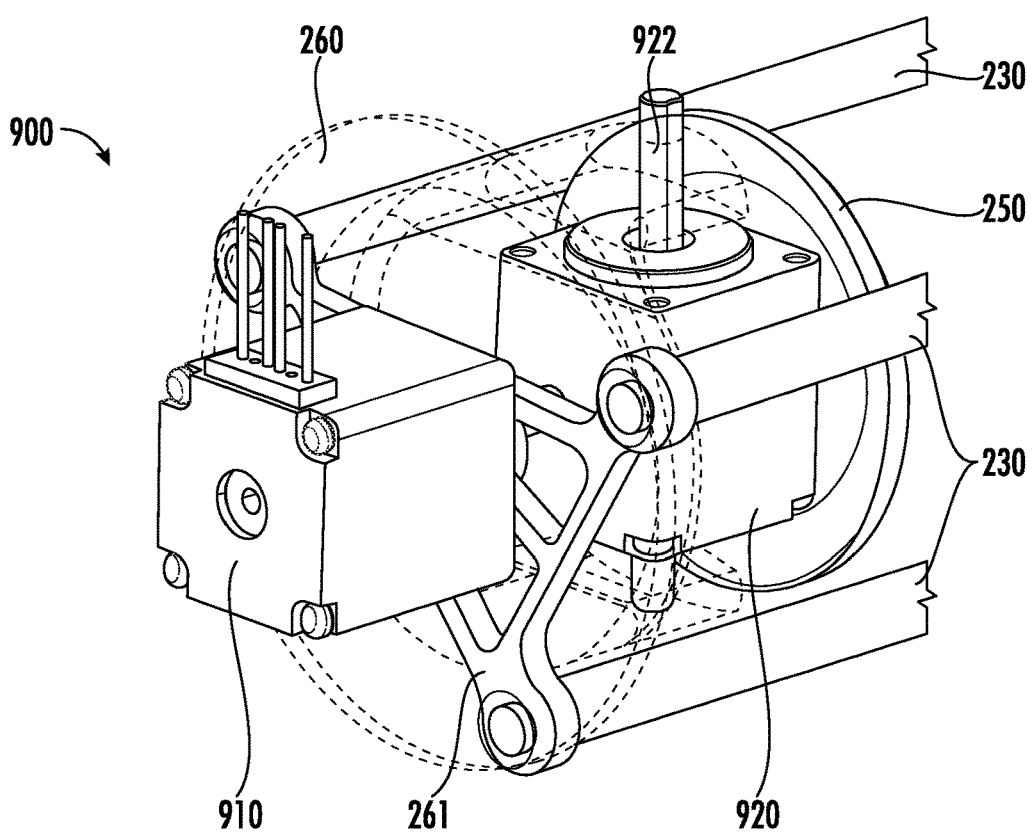
FIG. 11B is a top perspective view of the sub-reflector and adjustment mechanism of FIG. 11A.
Figure 11C:
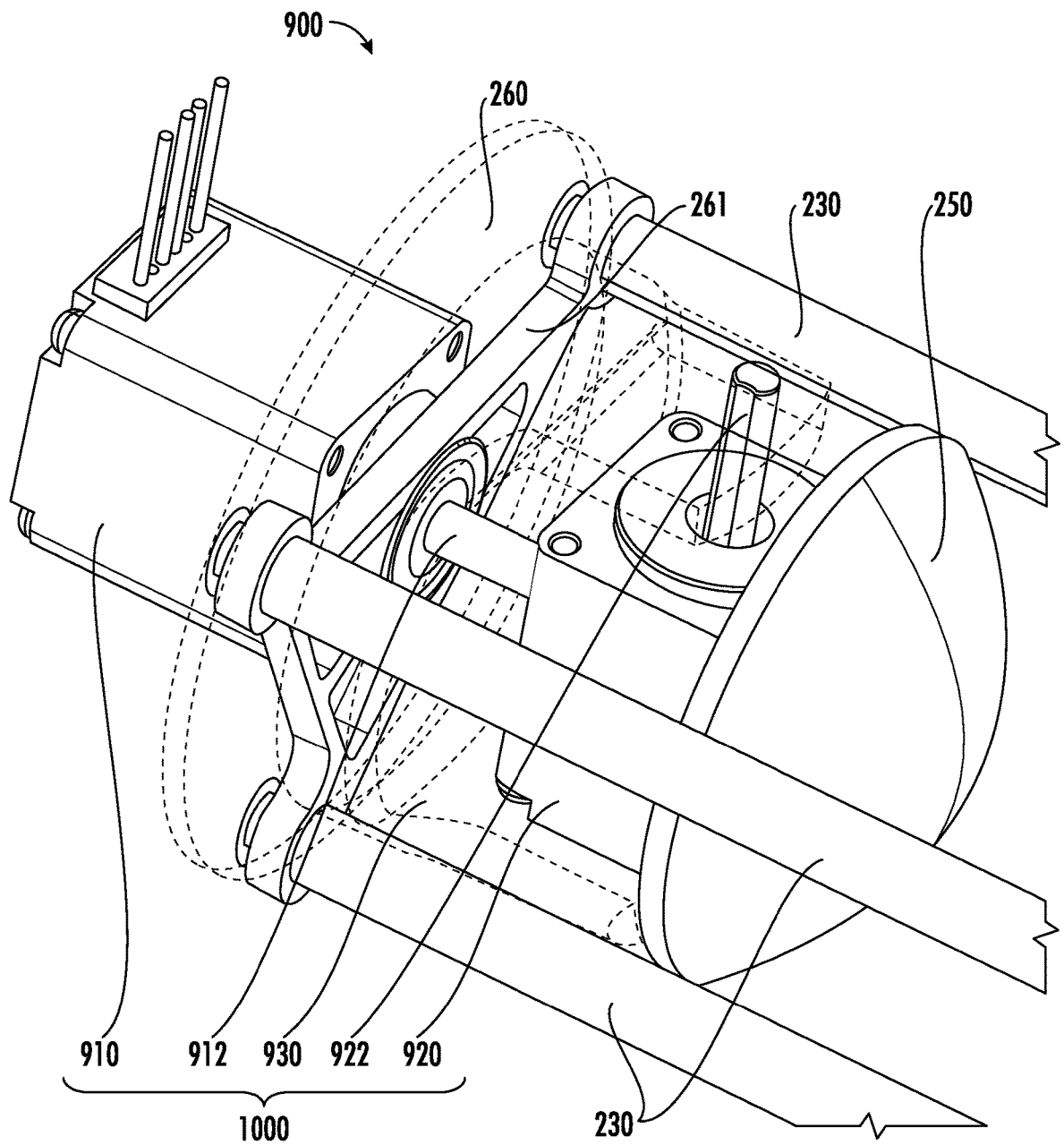
FIG. 11C is a rear perspective view of the sub-reflector and adjustment mechanism of FIG. 11A.

Referring now to FIGS. 11A-11C, an alternative sub-reflector assembly 900 is illustrated which utilizes an adjustment mechanism 1000 that has a gimbal design. Similar to the sub-reflector assembly 700 described herein, the sub-reflector assembly 900 is located in front of the main reflector with the sub-reflector 250. As shown in FIGS. 11A-11C, the adjustment mechanism 1000 comprises a first stepper motor 910, a second stepper motor 920, and a rotating member 930. The first stepper motor 910 may be secured to the support plate 260 and is coupled to a main body 932 of the rotating member 930. For example, as shown in FIGS. 11A and 11C, in some embodiments, a gear rod 912 extending outwardly from the first stepper motor 910 (along axis A) couples the first stepper motor 910 to the rotating member 930. In some embodiments, the rotating member 930 further comprises a pair of opposing arms 934 extending outwardly from, and generally perpendicular to, the main body 932 (i.e., having a C-shaped profile). The second stepper motor 920 is coupled to the rotating member 930 and resides between the opposing arms 934. In some embodiments, a second gear rod 922 extending outwardly (perpendicularly to axis A) from the second stepper motor 920 couples the second stepper motor 920 to the rotating member 930. The second stepper motor 920 is secured to the sub-reflector 250.

As noted above, in some embodiments, the sub-reflector assembly 700 further includes a brace member 261 coupled to an end of each support rod 230. The brace member 261 may provide additional structural support to the sub-reflector assembly 700, for example, to support plate 260 and the stepper motor 910 secured thereto.

In operation, a signal is sent to one or both stepper motors 910, 920 (e.g., wirelessly). The first stepper motor 910 is configured to rotate the rotating member 930 relative to the main reflector (i.e., through rotation of gear rod 912), and thus, subsequently rotate the sub-reflector 250 about axis A. The second stepper motor 920 is configured to pivot relative to the arms 934 of the rotating member 930 about axis B (i.e., through rotation of gear rod 922), and thus, subsequently tilt the sub-reflector 250. Through the adjustment mechanism 1000, the position of the sub-reflector 250 can be adjusted (i.e., rotated and/or tilted) relative to the main reflector to steer the beam direction of the antenna.

Figure 12A:
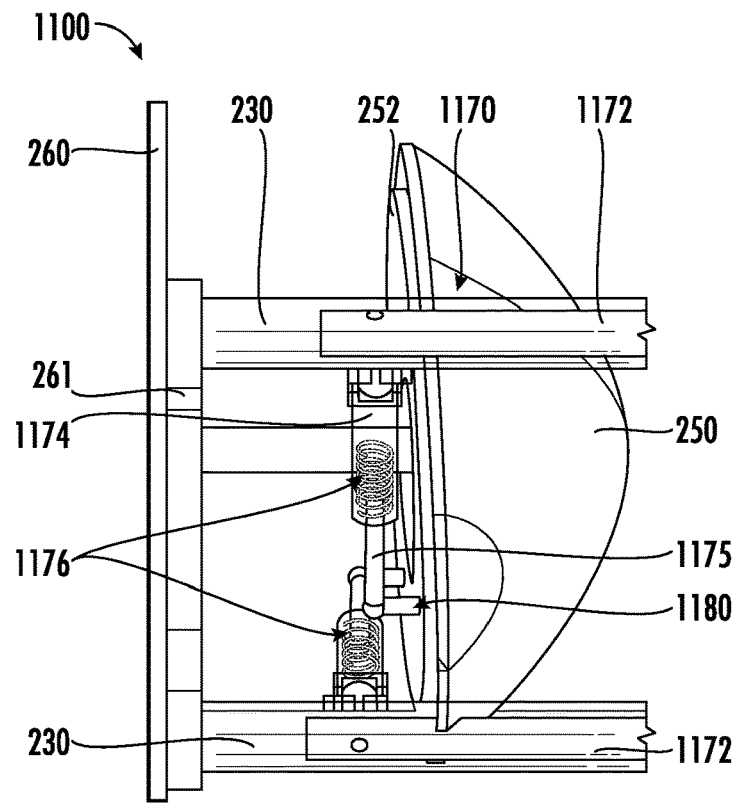
FIG. 12A is a side view of an alternative sub-reflector and adjustment mechanism utilizing spring-loaded arms according to embodiments of the present invention.
Figure 12B:
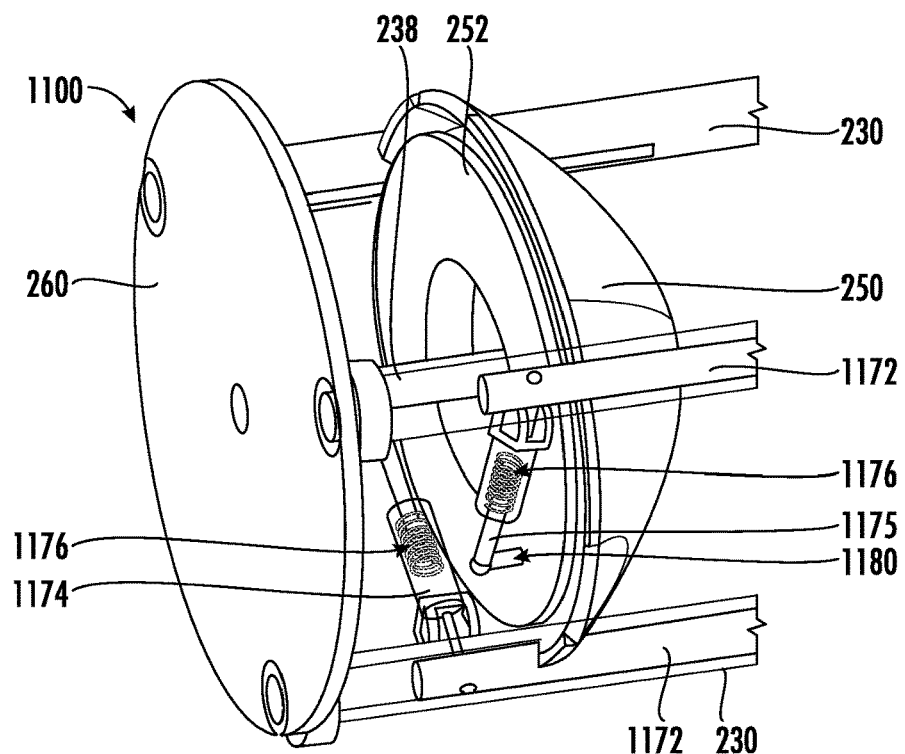
FIG. 12B is a perspective view of the sub-reflector and adjustment mechanism of FIG. 12A.

Referring now to FIGS. 12A-12B, an alternative sub-reflector assembly 1100 is illustrated. Sub-reflector assembly 1100 is similar to the sub-reflector assembly 200 described herein except for each of the arms 1174 of the pivot slider 1170 comprise a spring 1176 and arm extension member 1175 coupled to a ball joint member 1180. As shown in FIGS. 12A-12B, each spring 1176 biases the arm extension member 1175 against the corresponding ball joint member 1180 which are coupled to the sub-reflector 250.

Figure 17:
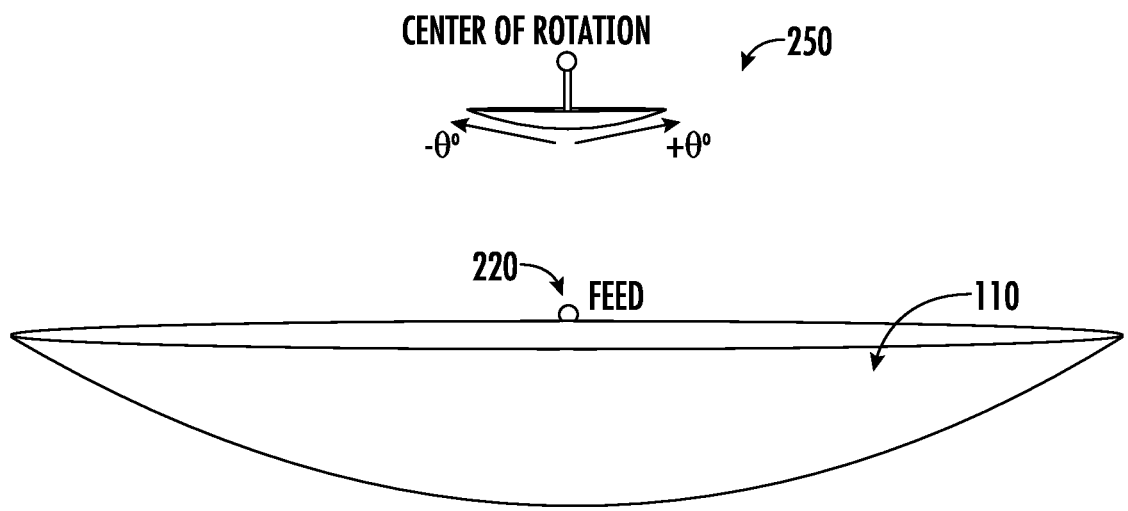
FIG. 17 is a schematic diagram illustrating the center of rotation for the sub-reflector assembly according to embodiments of the present invention.

The sub-reflector 250 is configured to pivot relative to the linear movement of the pivot sliders 1170 to adjust the direction of the antenna beam of the antenna 220. Similar to other pivot sliders described herein, the arms 1174 of the pivot sliders 1170 will slide within their respective slots 233 in the support members 230 in response to signals received by their respective drive assemblies (e.g., 240, 440) located behind the main reflector. As the pivot slider 1170 moves linearly (relative to a support member 230), the corresponding ball joint member 1180 is configured to pivot. The spring-loaded arms 1174 allow for extension of the arm extension members 1174 as needed with movement of the pivot slider 1170. As the ball joint members 1180 pivot in response to the linear movement of the corresponding pivot sliders 1170, the sub-reflector 250 pivots about central ball joint, i.e., about a center of rotation (e.g., about ball-and-socket joint 251 created by the ball joint 238a of support member 238 and the ball socket 250a of the sub-reflector 250 as shown in FIG. 5D and FIG. 17). In some embodiments, a universal joint 640 as described herein (see, e.g., FIGS. 9B-9C) may replace the central ball-and-socket joint 251. Through movement of the pivot sliders 1170 and ball joint members 1180, the position of the sub-reflector 250 can be adjusted relative to the sub-reflector assembly 1100 to steer the beam direction of the antenna.

Figure 13A:
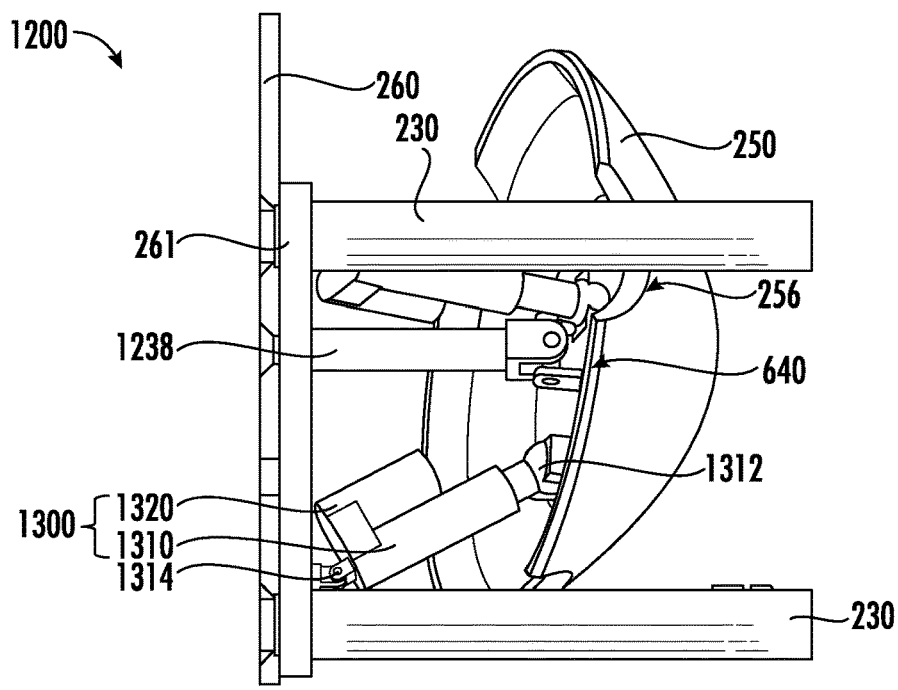
FIG. 13A is a side view of an alternative sub-reflector and adjustment mechanism utilizing linear actuators according to embodiments of the present invention.
Figure 13B:
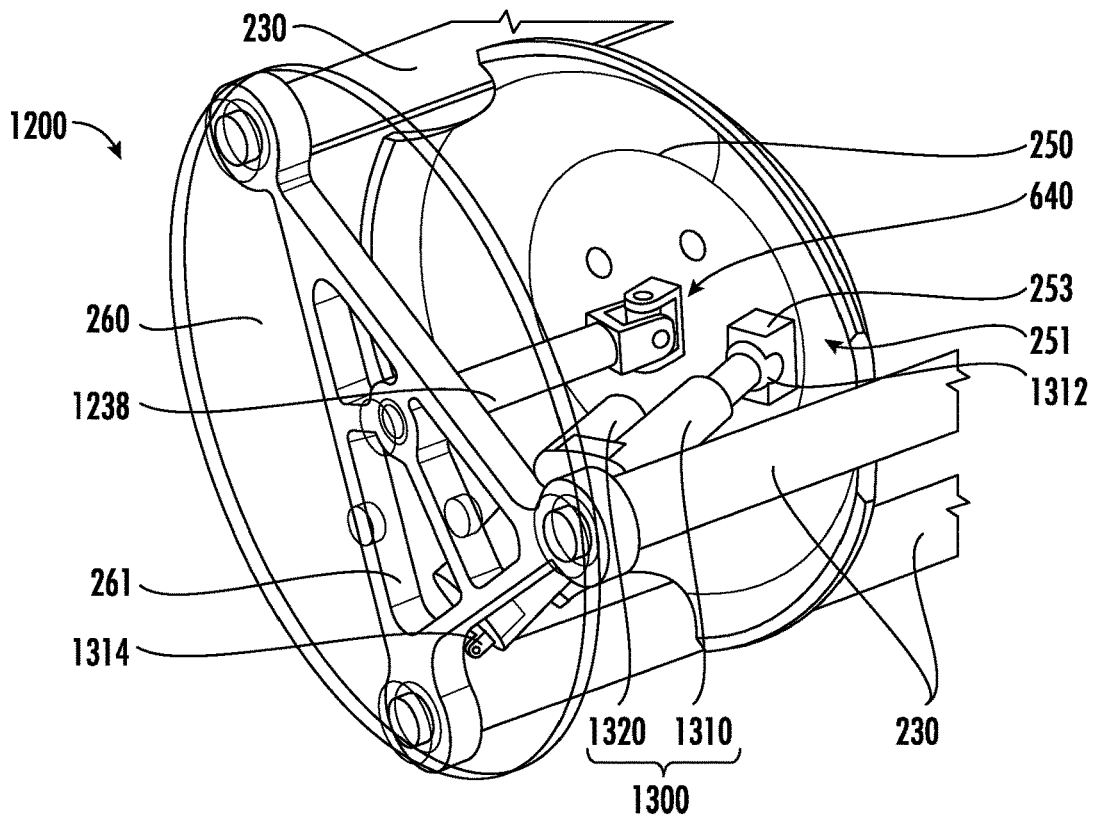
FIG. 13B is a perspective view of the sub-reflector and adjustment mechanism of FIG. 13A.

Referring to FIGS. 13A-13B, an alternative sub-reflector assembly 1200 is illustrated which utilizes adjustment mechanisms 1300 comprising one or more linear actuators 1310 and corresponding controllers 1320 to adjust (i.e., pivot) the sub-reflector 250. The controllers 1320 are configured to receive signals (e.g., wirelessly) and control the movement of a respective linear actuator 1310.

The sub-reflector assembly 1200 is located in front of the main reflector with the sub-reflector 250. Similar to other sub-reflector assemblies described herein, sub-reflector assembly 1200 includes a brace member 261 to which one end of each adjustment mechanism 1300 (i.e., linear actuators 1310 and corresponding controllers 1320) is coupled to via a securing feature 1314 (e.g., a rotating hinge). The opposing end of each linear actuator 1310 comprise a ball joint 1314. Each ball joint 1314 is configured to be received within a respective socket member 253 that is coupled to the sub-reflector 250 to form a corresponding ball-and-socket joint 251. The sub-reflector assembly 1200 further includes a support member 1238 coupled to the center of the sub-reflector 250 via a universal joint 640 as described herein. Similar to other sub-reflector assemblies, the universal joint 640 may be replaced by a central ball-and-socket joint 251 as described herein. The sub-reflector 250 is configured to pivot relative to the movement of the linear actuators 1310 to adjust the direction of the antenna beam of the antenna. As the linear actuators 1310 expand and/or retract, the sub-reflector 250 pivots about the universal joint 640 (or ball-and-socket joint 251, when applicable), i.e., about a center of rotation (see, e.g., FIG. 17). Through movement of the linear actuators 1320 (via signals received by the controllers 1320), the position of the sub-reflector 250 can be adjusted relative to the sub-reflector assembly 1200 to steer the beam direction of the antenna.

Figure 14A:
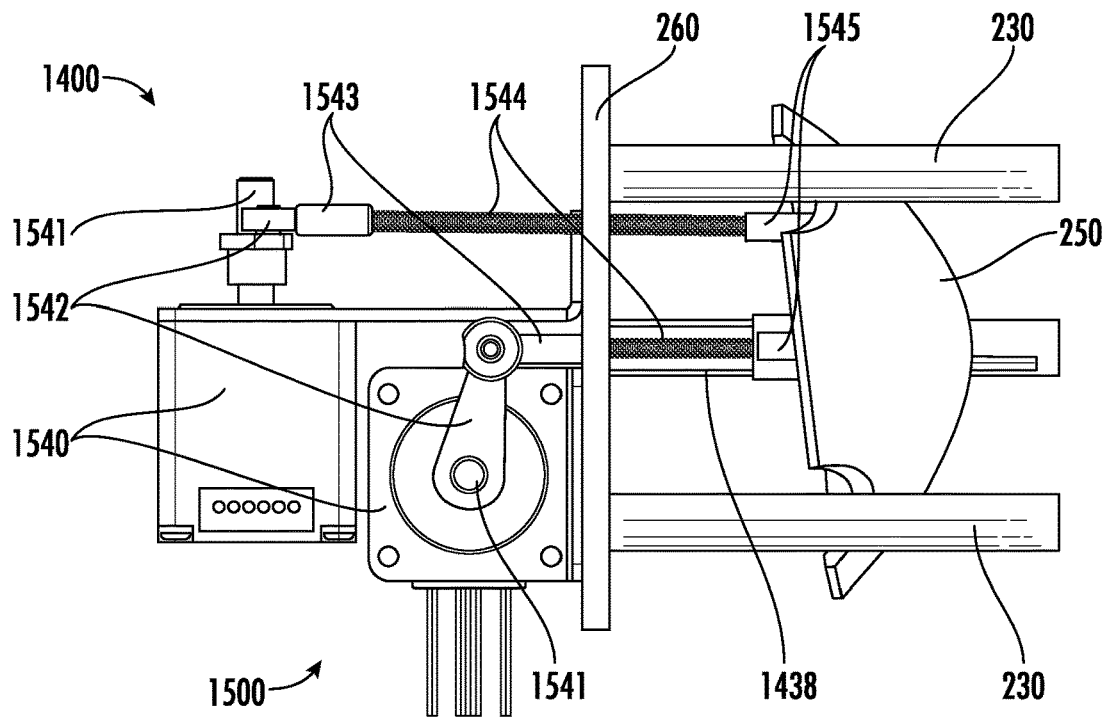
FIG. 14A is a side view of an alternative sub-reflector and adjustment mechanism utilizing a lever design according to embodiments of the present invention.
Figure 14B:
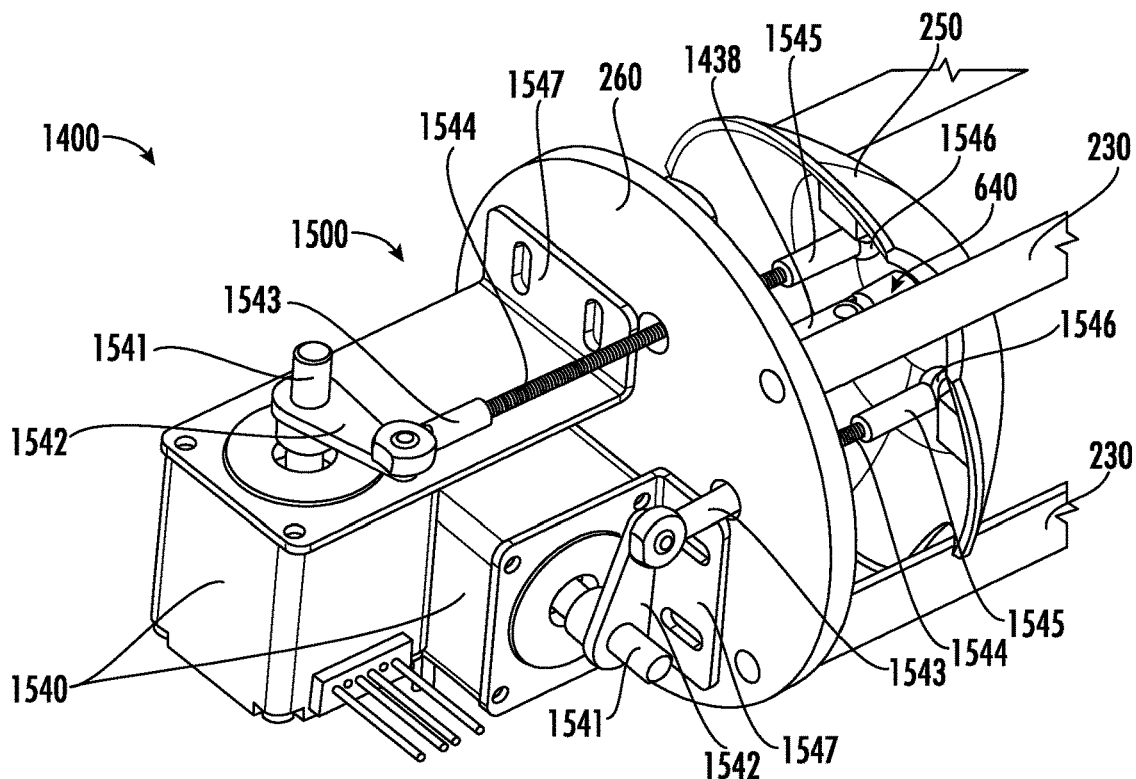
FIG. 14B is a perspective view of the sub-reflector and adjustment mechanism of FIG. 14A

Referring to FIGS. 14A-14B, an alternative sub-reflector assembly 1400 is illustrated which utilizes an adjustment mechanism 1500 that has a lever design. The adjustment mechanism 1500 comprises one or more drive motors 1540. For example, in some embodiments, the adjustment mechanism comprises a pair of drive motors 1540. In some embodiments, the drive motors 1540 are stepper motors. As shown in FIGS. 14A-14B, the sub-reflector assembly 1400 is located in front of the main reflector with the sub-reflector 250. In some embodiments, the drive motors 1540 are secured on top of the support plate 260 via one or more mounting brackets 1547.

Each motor 1540 is coupled to a respective lever 1544 and comprises a gear shaft 1541 that extends outwardly therefrom. Each gear shaft 1541 is coupled to a respective arm member 1542. The arm members 1542 are configured to rotate in response to rotation of the respective gear shafts 1541. A mechanical linkage 1543 couples each arm member 1542 to a respective lever 1544. The one or more drive motors 1540 are configured to perform the actuation on one or more of the arm members 1542. The opposing end of each lever 1544 comprise a ball joint 1546. Similar to other sub-reflector assemblies described herein, each ball joint 1546 is configured to be received within a respective socket member 253 (or socket 250a) that is coupled to the sub-reflector 250 to form a corresponding ball-and-socket joint 251. In addition, similar to other sub-reflector assemblies described herein, the sub-reflector assembly 1400 further includes a support member 1438 coupled to the center of the sub-reflector 250 via a universal joint 640. The universal joint 640 may be replaced by a central ball-and-socket joint 251 as described herein.

In operation, a signal is sent to one or both drive motors 1540 (e.g., wirelessly) to rotate the respective gear shafts 1541 and corresponding arm members 1542. The rotational movement of the gear shafts 1541 and arm members 1542 is converted to linear movement of the respective levers 1544. As the arm members 1542 rotate, the corresponding levers 1544 are raised or lowered and the sub-reflector 250 pivots about the universal joint 640 (or ball-and-socket joint 251, when applicable), i.e., about a center of rotation (see, e.g., FIG. 17). Through movement of the levers 1544, the position of the sub-reflector 250 can be adjusted relative to the sub-reflector assembly 1400 to steer the beam direction of the antenna.

Figure 15A:
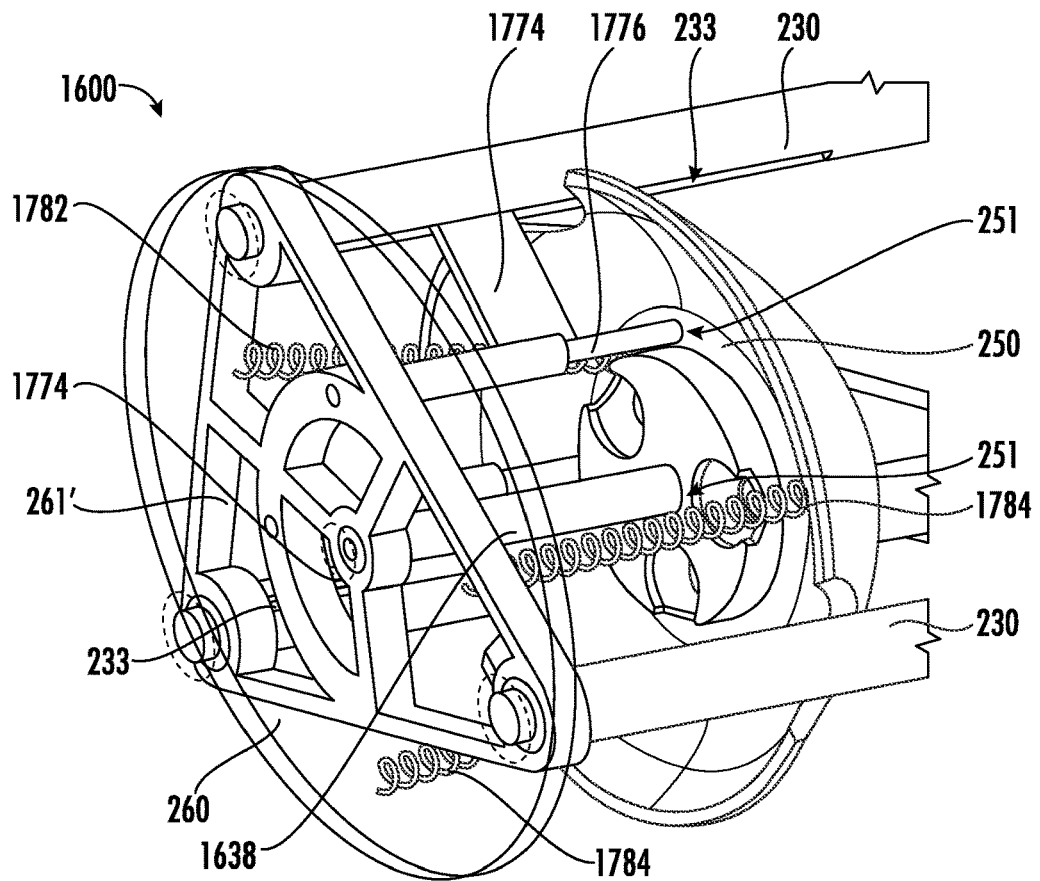
FIG. 15A is a perspective view of an alternative sub-reflector and adjustment mechanism utilizing levers and spring-loaded sub-reflector according to embodiments of the present invention.
Figure 15B:
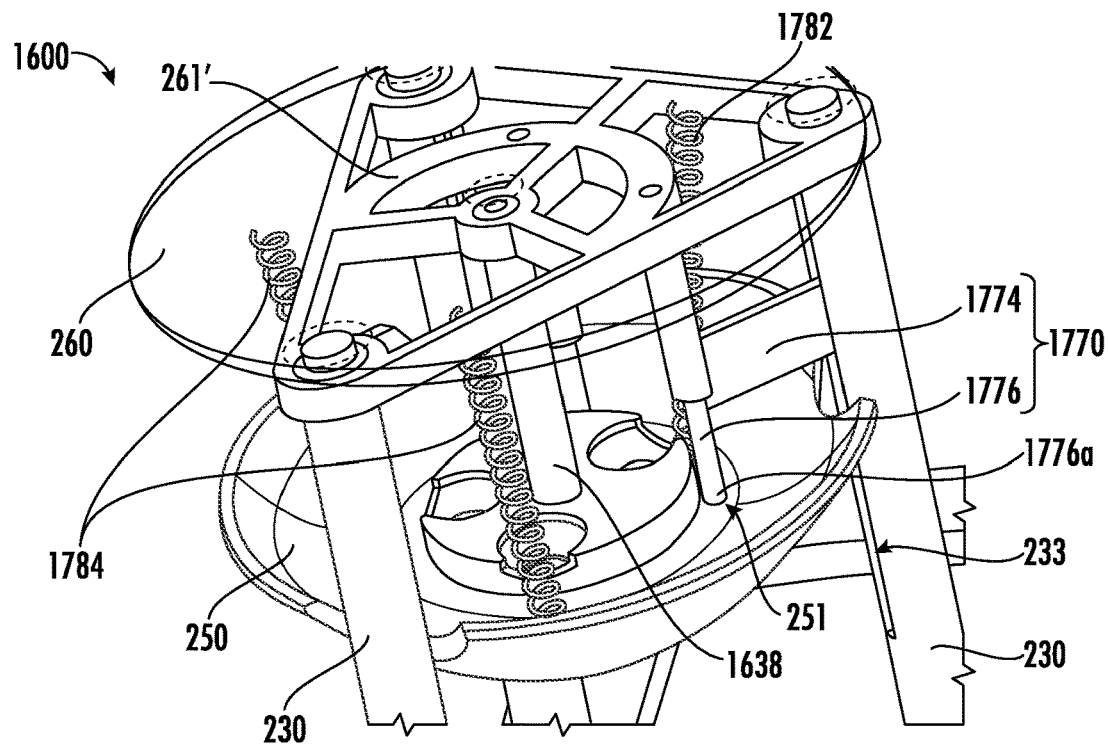
FIG. 15B is another perspective view of the sub-reflector and adjustment mechanism of FIG. 15A.
Figure 15C:
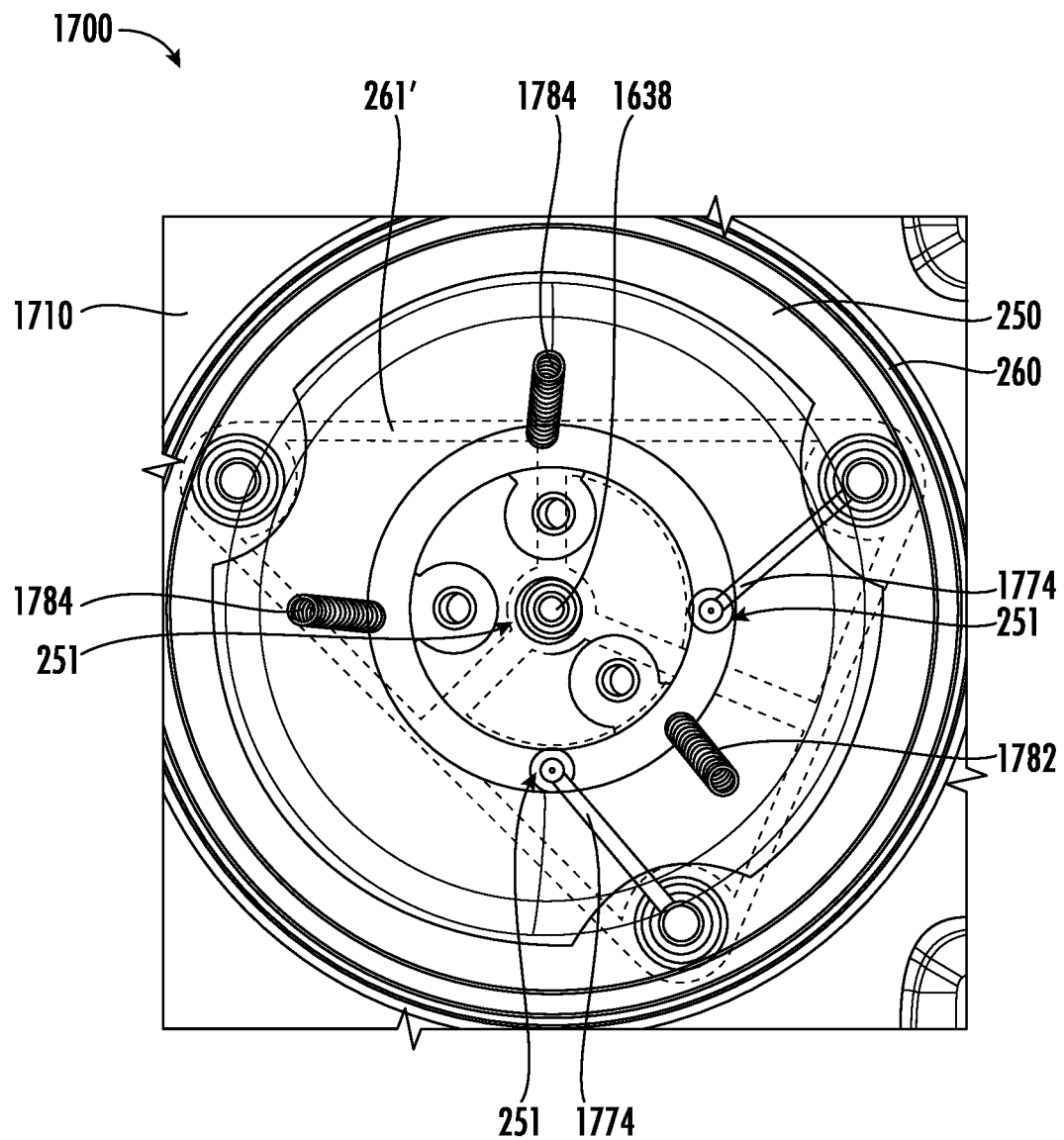
FIG. 15C is a top view of the sub-reflector and adjustment mechanism of FIG. 15A.

Referring to FIGS. 15A-15C, an alternative sub-reflector assembly 1600 having adjustment mechanism 1700 is illustrated. As shown in FIGS. 15A-15C, the adjustment mechanism 1700 comprises one or more pivot sliders 1770. Similar to other pivot sliders described herein, each of the pivot sliders 1770 of adjustment mechanism 1770 comprise an arm 1774 which extends radially inward through a slot 233 in the respective support member 230 which allows the pivot sliders 1770 to move axially relative to their respective support members 230. A lever 1776 is coupled to each arm 1774 of the pivot slider 1770. The opposing end of each lever 1776 comprise a ball joint 1776a. The opposing end of each lever 1776 acts as a point contact on the sub-reflector 250 causing rotation about the ball joint 1776a. Similar to other sub-reflector assemblies described herein, each ball joint 1776a is configured to be received within a socket 250a in the sub-reflector 250 or socket member 253 that is coupled to the sub-reflector 250 to form a corresponding ball-and-socket joint 251.

The adjustment mechanism 1700 further comprises a plurality of springs 1782, 1784 coupled between the support plate 260 and the sub-reflector 250 which are configured to bias the sub-reflector 250 at zero degrees of tilt. As shown in FIG. 15C, in some embodiments, the adjustment mechanism 1700 comprises a tension spring 1784 that is coupled to the sub-reflector 250 between the ball-and-socket joints 251 formed with the ball joints 1776a of the pivot sliders 1770. In some embodiments, the adjustment mechanism 1700 further comprises two compression springs 1782 coupled to the sub-reflector 250 opposed to the tension spring 1784. The compression and tension springs 1782, 1784 are configured to compress or expand in response to movement of the pivot sliders 1770 (and corresponding levers 1776).

In operation, the pivot sliders 1770 move axially relative to their respective support members 230 via any of the manners described herein (e.g., driving struts controlled via drive assemblies) which causes the corresponding levers 1776 to adjust and tilt the spring-loaded sub-reflector 250. For example, as the pivot sliders 1770 axially move toward the sub-reflector 250, the levers 1776 push down on the sub-reflector 250), which force the compression springs 1782 to compress. As the pivot sliders 1770 (and corresponding levers 1776) axially move away from the sub-reflector 250, the force on the compression springs 1782 is relieved and the tension spring 1784 pulls on the sub-reflector 250. Through movement of the pivot sliders 1770 and springs 1782, 1784, the position of the sub-reflector 250 can be adjusted relative to the sub-reflector assembly 1600 to steer the beam direction of the antenna.

Figure 16:
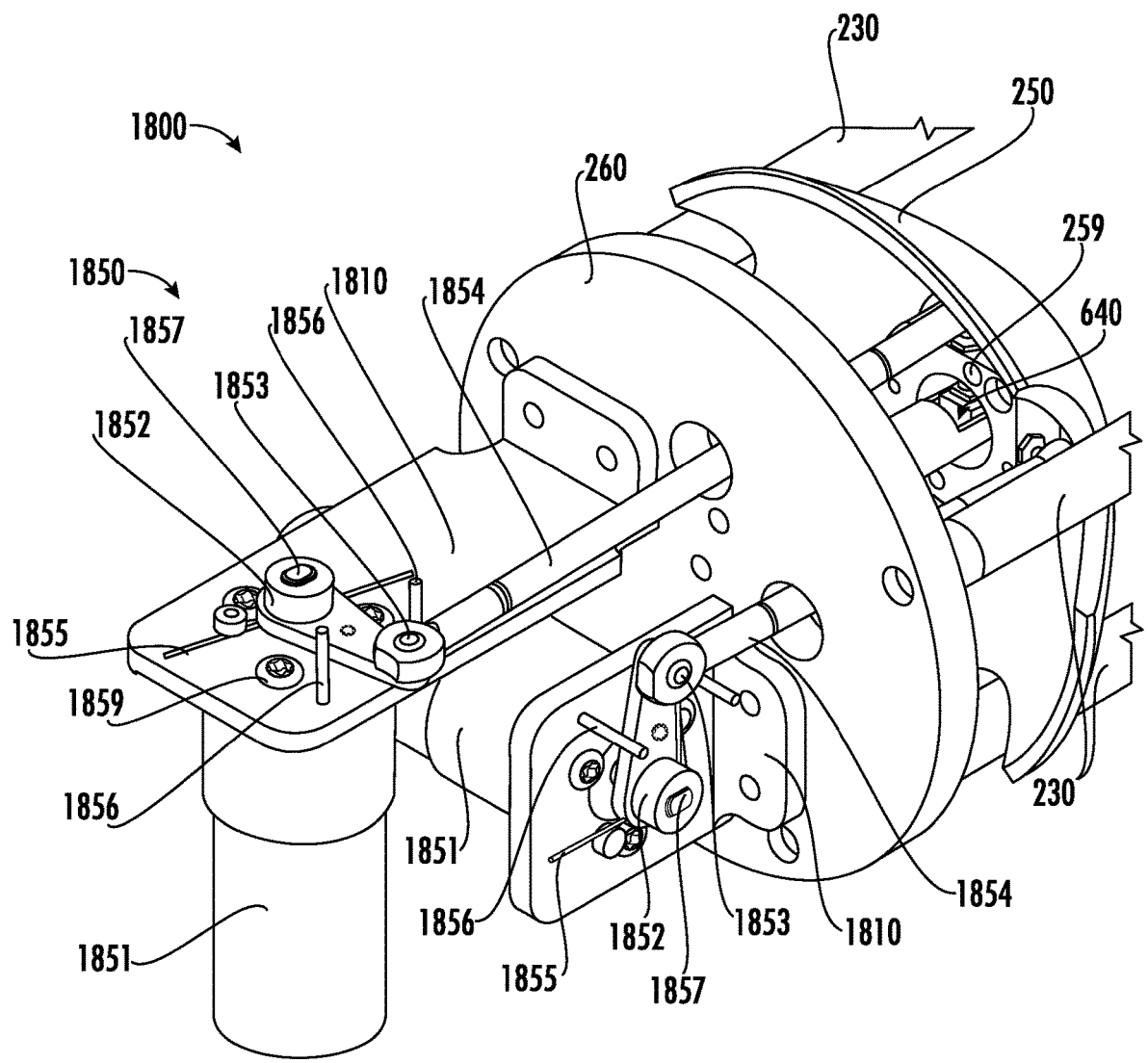
FIG. 16 is a perspective view of an alternative adjustment mechanism for the sub-reflector according to embodiments of the present invention.

According to embodiments of the present invention, an alternative adjustment mechanism 1850 for one or more of sub-reflector assemblies described herein is illustrated in FIG. 16. Properties and/or features of the adjustment mechanism and/or sub-reflector assembly illustrated in FIG. 16 may be as described above in reference to the adjustment mechanisms and/or one or more of the sub-reflector assemblies described herein with reference to FIGS. 3A-15C and duplicate discussion thereof may be omitted herein for the purposes of discussing FIG. 16. As shown in FIG. 16, the adjustment mechanism 1850 further comprises a plurality of limiters 1856, a spring 1855, and dowl holes 259, 269 configured to receive respective an alignment pin, each being described in further detail below.

The adjustment mechanism 1850 comprises one or more drive motors 1851. For example, in some embodiments, the adjustment mechanism comprises a pair of drive motors 1851. As shown in FIG. 16, similar to other sub-reflector assemblies described herein, the sub-reflector assembly 1800 is located in front of the main reflector with the sub-reflector 250. In some embodiments, the drive motors 1851 are secured on top of the support plate 260 via one or more mounting brackets 1810. Each drive motor 1851 may be secured to respective mounting bracket 1810 by one or more button head screws 1859 or like fastening mechanism. In some embodiments, the sub-reflector assembly 1800 may further include one or more dowl holes 259, 269. The dowl holes are positioned between the top plate 260 and the sub-reflector 250 and are configured to receive an alignment pin for initial zeroing of the sub-reflector assembly 1800.

Still referring to FIG. 16, each motor 1851 is coupled to a respective lever 1854 and comprises a gear shaft 1857 that extends outwardly therefrom. Each gear shaft 1857 is coupled to a respective arm member 1852. The arm members 1852 are configured to rotate in response to rotation of the respective gear shafts 1857. In some embodiments, to help combat backlash, a spring 1855 may be coupled to the back of each arm member 1852. In addition, a plurality of limiters 1856 may be coupled to the mounting brackets 1810 to limit movement of the arm members 1852. A mechanical linkage 1853 couples each arm member 1852 to a respective lever 1854. The one or more drive motors 1851 are configured to perform the actuation on one or more of the arm members 1852. The opposing end of each lever 1854 comprise a ball joint as described herein. Similar to other sub-reflector assemblies described herein, each ball joint is configured to be received within a respective socket member that is coupled to the sub-reflector 250 to form a corresponding ball-and-socket joint. See, e.g., FIGS. 14A-14C.

In operation, a signal is sent to one or both drive motors 1851 (e.g., wirelessly) to rotate the respective gear shafts 1857 and corresponding arm members 1852. The rotational movement of the gear shafts 1857 and arm members 1852 is converted to linear movement of the respective levers 1854. As the arm members 1852 rotate, the corresponding levers 1854 are raised or lowered and the sub-reflector 250 pivots about the universal joint or ball-and-socket joint, when applicable), i.e., about a center of rotation (see, e.g., FIG. 17). Through movement of the levers 1854, the position of the sub-reflector 250 can be adjusted relative to the sub-reflector assembly 1800 to steer the beam direction of the antenna.

Figure 18:
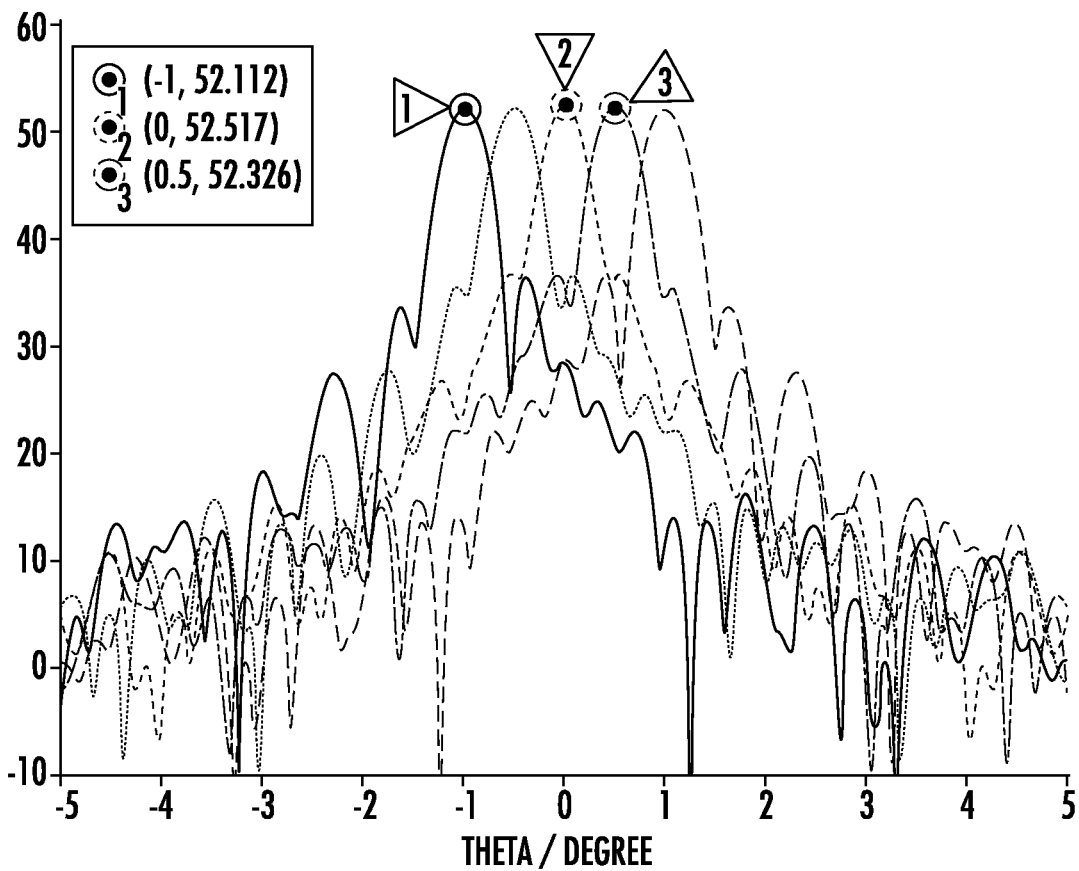
FIG. 18 is a graph illustrating exemplary beam radiation patterns for the sub-reflector assembly according to embodiments of the present invention.

FIG. 18 is a graph illustrating exemplary beam radiation patterns for the sub-reflector assembly according to embodiments of the present invention. According to some embodiments, the antenna assembly 100 of the present invention may obtain antenna gains in the order of 50 dBi or more. The antenna gains obtained by the antenna assembly 100 of the present invention are not necessarily with respect to a particular type of antenna architecture or layout. In some embodiments, the antenna assembly 100 of the present invention may operate in a frequency range between about 30 GHz to about 80 GHz. In some embodiments, a two-foot antenna (e.g., the main reflector 110) has a focal length to aperture size ratio (f/D) of about 0.19 (defined by gain and typical efficiency of the order of 50% efficiency at 71-86 GHz). With respect to the electrical alignment specifications, in some embodiments, the gain per effective isotropic radiated power (EIRP) in the desired link direction of the antenna assembly 100 is maintained within the value associated with 30% of the 3 dB beam width. With respect to the mechanical alignment specifications, in some embodiments, the angular range of the antenna assembly 100 can be adjusted along both azimuth and elevation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A sub-reflector assembly for a point-to-point antenna, the sub-reflector assembly comprising:
    a main body configured to hold an antenna;
    a sub-reflector supported by a plurality of support members extending axially outwardly from the main body; and
    an adjustment mechanism coupled to the sub-reflector and at least two of the support members, the adjustment mechanism configured to adjust a position of the sub-reflector relative to the main body to steer an antenna beam from the antenna.

2. The sub-reflector assembly of claim 1, further comprising an antenna housing coupled to the main body, the antenna housing containing the antenna, wherein the plurality of support members extend axially outwardly from the housing.

3. The sub-reflector assembly of claim 1, the assembly comprising three support members equally-spaced apart from each other, wherein at least two of the support members are hollow.

4. The sub-reflector assembly of claim 1, further comprising a support plate secured to a free end of each of the support members.

5. The sub-reflector assembly of claim 1, further comprising a fourth support member extending axially outwardly from the center of the sub-reflector, the fourth support member configured to secure the sub-reflector to the support plate.

6. The sub-reflector assembly of claim 5, wherein the fourth support member comprises a ball joint configured to be received by a corresponding ball socket in the center of the sub-reflector to form a ball-and-socket joint.

7. The sub-reflector assembly of claim 1, wherein the sub-reflector comprises a plurality of arcuate recesses residing along an outer edge, each recess being positioned relative to a corresponding support member.

8. The sub-reflector assembly of claim 5, wherein the fourth support member is coupled to the center of the sub-reflector via a universal joint.

9. The sub-reflector assembly of claim 1, wherein the adjustment mechanism comprises:
    a pair of drive motors, each drive motor having a gear shaft extending outwardly therefrom;
    a pair of arm members, each arm member coupled to a respective gear shaft and configured to rotate in response to rotation of the gear shaft; and
    a pair of levers, each lever coupled to a respective arm member via a mechanical linkage, the opposing end of each lever comprising a ball joint configured to be received within corresponding socket on the sub-reflector.

10. The sub-reflector assembly of claim 2, wherein the plurality of support members extend axially outwardly from the antenna housing.

11. The sub-reflector assembly of claim 1, further comprising a drive assembly including two drive motors and corresponding gear system, the drive assembly being coupled to the adjustment mechanism.

12. The sub-reflector assembly of claim 1, wherein the adjustment mechanism comprises three legs coupled together via a first rotating joint, wherein two of the legs are each coupled to a respective drive assembly and the third leg is coupled to a base member via a second rotating joint, and wherein the base member is coupled to the sub-reflector.

13. The sub-reflector assembly of claim 1, wherein the adjustment mechanism comprises a first stepper motor, a second stepper motor, and a rotating member, the first stepper motor coupled to a main body of the rotating member via a first gear rod and the second stepper motor coupled between a pair of opposing arms of the rotating member via a second gear rod, wherein the second stepper motor is secured to the sub-reflector.

14. The sub-reflector assembly of claim 1, wherein the adjustment mechanism comprises one or more linear actuators.

15. The sub-reflector assembly of claim 1, wherein the adjustment mechanism comprises two pivot sliders, each pivot slider comprising an arm and a lever coupled to the arm.

16. The sub-reflector assembly of claim 15, where the adjustment mechanism further comprises a plurality of springs coupled between a support plate and the sub-reflector which are configured to bias the sub-reflector.

17. The sub-reflector assembly of claim 16, wherein the plurality of springs comprise a tension spring and two compression springs.

18. A sub-reflector assembly for a point-to-point antenna, the sub-reflector assembly comprising: a main body configured to hold an antenna; a sub-reflector supported by a plurality of support members extending axially outwardly from the main body, wherein one of the support members extends axially outwardly from the center of the sub-reflector; and an adjustment mechanism coupled to the sub-reflector and at least two of the support members, the adjustment mechanism configured to adjust a position of the sub-reflector relative to the main body to steer an antenna beam from the antenna, wherein the adjustment mechanism comprises: a pair of drive motors, each drive motor having a gear shaft extending outwardly therefrom; a pair of arm members, each arm member coupled to a respective gear shaft and configured to rotate in response to rotation of the gear shaft; and a pair of levers, each lever coupled to a respective arm member via a mechanical linkage, the opposing end of each lever comprising a ball joint configured to be received within corresponding socket on the sub-reflector.

19. A sub-reflector assembly for a point-to-point antenna, the sub-reflector assembly comprising: a main body configured to hold an antenna; a sub-reflector supported by a plurality of support members extending axially outwardly from the main body, wherein one of the support members extends axially outwardly from the center of the sub-reflector; and an adjustment mechanism coupled to the sub-reflector and at least two of the support members, the adjustment mechanism configured to adjust a position of the sub-reflector relative to the main body to steer an antenna beam from the antenna, wherein the adjustment mechanism comprises a first stepper motor, a second stepper motor, and a rotating member, the first stepper motor coupled to a main body of the rotating member via a first gear rod and the second stepper motor coupled between a pair of opposing Page 6 or 9 arms of the rotating member via a second gear rod, wherein the second stepper motor is secured to the sub-reflector.

* * * * *

UNITED STATES PATENT AND TRADEMARK OFFICE
CERTIFICATE OF CORRECTION

Page 1 of 2

PATENT NO. : 12,327,920 B2
APPLICATION NO. : 18/296179
DATED : June 10, 2025
INVENTOR(S) : Whyte et al.

It is certified that error appears in the above-identified patent and that said Letters Patent is hereby corrected as shown below:

In the Claims

Column 17, Line 17 - Column 18, Line 8, Claim 18: Please delete and replace with the following:
18. A sub-reflector assembly for a point-to-point antenna, the sub-reflector assembly comprising:
    a main body configured to hold an antenna;
    a sub-reflector supported by a plurality of support members extending axially outwardly from the main body, wherein one of the support members extends axially outwardly from the center of the sub-reflector; and
    an adjustment mechanism coupled to the sub-reflector and at least two of the support members, the adjustment mechanism configured to adjust a position of the sub-reflector relative to the main body to steer an antenna beam from the antenna, wherein the adjustment mechanism comprises:
    a pair of drive motors, each drive motor having a gear shaft extending outwardly therefrom;
    a pair of arm members, each arm member coupled to a respective gear shaft and configured to rotate in response to rotation of the gear shaft; and
    a pair of levers, each lever coupled to a respective arm member via a mechanical linkage, the opposing end of each lever comprising a ball joint configured to be received within corresponding socket on the sub-reflector.

Column 18, Lines 24-25, Claim 19: Please correct "opposing Page 6 or 9 arms" to read --opposing arms--

Column 18, Lines 9-27, Claim 19: Please delete and replace with the following:
19. A sub-reflector assembly for a point-to-point antenna, the sub-reflector assembly comprising:
    a main body configured to hold an antenna;

Signed and Sealed this
Thirtieth Day of September, 2025

John A. Squires
*Director of the United States Patent and Trademark Office* a sub-reflector supported by a plurality of support members extending axially outwardly from the main body, wherein one of the support members extends axially outwardly from the center of the sub-reflector; and an adjustment mechanism coupled to the sub-reflector and at least two of the support members, the adjustment mechanism configured to adjust a position of the sub-reflector relative to the main body to steer an antenna beam from the antenna, wherein the adjustment mechanism comprises a first stepper motor, a second stepper motor, and a rotating member, the first stepper motor coupled to a main body of the rotating member via a first gear rod and the second stepper motor coupled between a pair of opposing arms of the rotating member via a second gear rod, wherein the second stepper motor is secured to the sub-reflector.